(12) United States Patent
Choi et al.

(10) Patent No.: US 10,508,175 B2
(45) Date of Patent: Dec. 17, 2019

(54) COMPOSITION AND POLYAMIDEIMIDE COMPOSITE AND POLYAMIDEIMIDE FILM AND ELECTRONIC DEVICE

(71) Applicants: SAMSUNG ELECTRONICS CO., LTD., Suwon-si, Gyeonggi-do (KR); SAMSUNG SDI CO., LTD., Yongin-si, Gyeonggi-do (KR)

(72) Inventors: Sungwon Choi, Hwaseong-si (KR); Chanjae Ahn, Suwon-si (KR); Hyunjeong Jeon, Seoul (KR); Sang Soo Jee, Hwaseong-si (KR); Byunghee Sohn, Yongin-si (KR); Won Suk Chang, Hwaseong-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 112 days.

(21) Appl. No.: 15/720,992

(22) Filed: Sep. 29, 2017

(65) Prior Publication Data
US 2018/0022875 A1 Jan. 25, 2018

Related U.S. Application Data

(63) Continuation-in-part of application No. 15/081,468, filed on Mar. 25, 2016, now Pat. No. 9,975,997.

(30) Foreign Application Priority Data

Mar. 27, 2015 (KR) .................. 10-2015-0043489
Mar. 23, 2016 (KR) .................. 10-2016-0034556
Oct. 5, 2016 (KR) .................. 10-2016-0128609
Sep. 25, 2017 (KR) .................. 10-2017-0123704

(51) Int. Cl.
| | |
|---|---|
| C08G 77/445 | (2006.01) |
| C08G 77/455 | (2006.01) |
| C08G 77/04 | (2006.01) |
| C08L 83/12 | (2006.01) |
| C08G 73/14 | (2006.01) |
| C08G 73/10 | (2006.01) |
| C08L 79/08 | (2006.01) |
| C09D 179/08 | (2006.01) |
| C08G 77/00 | (2006.01) |
| C08G 77/16 | (2006.01) |
| C08G 77/18 | (2006.01) |

(52) U.S. Cl.
CPC ........ *C08G 77/455* (2013.01); *C08G 73/1007* (2013.01); *C08G 73/1017* (2013.01); *C08G 73/1039* (2013.01); *C08G 73/1042* (2013.01); *C08G 73/1067* (2013.01); *C08G 73/14* (2013.01); *C08G 77/04* (2013.01); *C08L 79/08* (2013.01); *C08L 83/12* (2013.01); *C09D 179/08* (2013.01); *C08G 77/16* (2013.01); *C08G 77/18* (2013.01); *C08G 77/80* (2013.01)

(58) Field of Classification Search
CPC combination set(s) only.
See application file for complete search history.

(56) References Cited

U.S. PATENT DOCUMENTS

| | | | |
|---|---|---|---|
| 8,791,227 B1 | 7/2014 | Tan et al. | |
| 2003/0049193 A1* | 3/2003 | Satsu | C08L 79/08 423/325 |
| 2003/0098176 A1* | 5/2003 | Mesaki | C08G 73/14 174/120 R |
| 2004/0052649 A1* | 3/2004 | Murase | F04B 27/0878 417/222.1 |
| 2004/0247907 A1* | 12/2004 | Goda | B32B 7/12 428/473.5 |
| 2017/0145166 A1* | 5/2017 | Jeon | C08G 83/001 |
| 2018/0086919 A1* | 3/2018 | Gantillon | C09D 179/08 |

FOREIGN PATENT DOCUMENTS

| | | | |
|---|---|---|---|
| JP | 2005-187768 A | | 7/2005 |
| JP | 5883566 B2 | | 2/2016 |
| JP | 2017-095709 | * | 6/2017 |
| KR | 10-1596089 B1 | | 2/2016 |

* cited by examiner

*Primary Examiner* — Marc S Zimmer
(74) *Attorney, Agent, or Firm* — Cantor Colburn LLP

(57) ABSTRACT

A composition including a polyamideimide precursor modified with an alkoxysilane group and an oligosilica compound, wherein the oligosilica compound is a condensation reaction product of an organosilane diol and an alkoxysilane compound.

22 Claims, 1 Drawing Sheet

COMPOSITION AND POLYAMIDEIMIDE COMPOSITE AND POLYAMIDEIMIDE FILM AND ELECTRONIC DEVICE

CROSS-REFERENCE TO RELATED APPLICATION

This application is a continuation-in-part of U.S. patent application Ser. No. 15/081,468 filed on Mar. 25, 2016 in the United States Patent and Trademark Office and claiming priority to Korean Patent Application Nos. 10-2015-0043489 and 10-2016-0034556 filed in the Korean Intellectual Property Office on Mar. 27, 2015 and Mar. 23, 2016, respectively, which claims priority to Korean Patent Application Nos. 10-2016-0128609 and 10-2017-0123704 filed in the Korean Intellectual Property Office on Oct. 5, 2016 and Sep. 25, 2017, respectively, and all the benefits accruing therefrom under 35 U.S.C. § 119, the contents of which are incorporated herein in their entirety by reference.

BACKGROUND

1. Field

A composition, a polyamideimide composite, and a polyamideimide film and an electronic device are disclosed.

2. Description of the Related Art

A portable electronic device, such as a smart phone, a tablet PC, or the like, includes a display device that has to be flexible (bendable, foldable, or rollable), thin, and light.

Currently, the display device mounted on the portable electronic device uses rigid glass to protect a display module. However, the glass lacks flexibility, and thus may not be used in a flexible display device. Accordingly, there is a need for a transparent film made of a polymer material as an alternative to the glass.

SUMMARY

An embodiment provides a composition capable of improving optical properties and mechanical characteristics of a film.

Another embodiment provides a composite capable of improving optical properties and mechanical characteristics of a film.

Yet another embodiment provides a film capable of improving optical properties and mechanical characteristics.

Still another embodiment provides an electronic device including the film.

According to an embodiment, a composition includes:

a polyamideimide precursor modified with an alkoxysilane group and an oligo silica compound, wherein the oligosilica compound is a condensation reaction product of an organosilane diol and an alkoxysilane compound.

The composition may include water in a trace amount of less than or equal to about 100 parts per million.

The composition may not include water.

The organosilane diol may be represented by Chemical Formula 1.

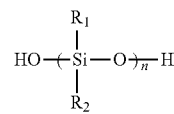

Chemical Formula 1

In Chemical Formula 1, $R_1$ and $R_2$ are independently a substituted or unsubstituted C1 to C20 alkyl group, a substituted or unsubstituted C3 to C8 cycloalkyl group, a substituted or unsubstituted C2 to C20 alkenyl group, a substituted or unsubstituted C2 to C20 alkynyl group, or a substituted or unsubstituted C6 to C20 aryl group, and n is an integer ranging from 1 to 10.

At least one of $R^1$ and $R^2$ of Chemical Formula 1 may be a C6 to C20 aryl group.

The alkoxysilane compound may be trialkoxysilane, tetraalkoxysilane, or a combination thereof.

The alkoxysilane compound may be tetramethoxysilane, tetraethoxysilane, or a combination thereof.

The oligosilica compound may be obtained by a non-hydrolytic condensation reaction of the organosilane diol and the alkoxysilane compound under the presence of an alkaline-earth metal hydroxide.

The oligosilica compound may be included in an amount of about 0.1 percent by weight to about 30 percent by weight based on a total amount of the composition.

The oligosilica compound may be included in an amount of about 5 percent by weight to about 20 percent by weight based on a total amount of the composition.

The polyamideimide precursor modified with an alkoxysilane group may be a reaction product of (i) the polyamideimide precursor obtained from an anhydride compound, a diamine compound, and a dicarboxylic acid compound, and (ii) a reactive organosilane compound.

The reactive organosilane compound may be represented by Chemical Formula 2.

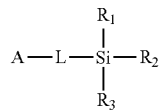

Chemical Formula 2

In Chemical Formula 2, $R_1$ to $R_3$ are independently a C1 to C6 alkyl group or a C1 to C6 alkoxy group, provided that at least one of $R_1$ to $R_3$ is a C1 to C6 alkoxy group, L is a single bond, a substituted or unsubstituted C1 to C12 alkylene group, a substituted or unsubstituted C6 to C30 arylene group, a substituted or unsubstituted C1 to C12 heteroarylene group, or a combination thereof, and A is $-NH_2$, an anhydride group, or a carboxylic acid group.

The reactive organosilane compound may include gamma aminopropyl trimethoxysilane, aminophenyl trimethoxysilane, 3-(triethoxysilyl)propyl succinyl anhydride, or a combination thereof.

According to another embodiment, a polyamideimide composite includes a cured product of the composition.

The cured product may include a polyamideimide matrix and an oligosilica compound bound to or dispersed in the polyamideimide matrix.

The composite may include about 4 percent by weight to about 14 percent by weight of silicon (Si) based on a total amount of the composite.

According to another embodiment, a polyamideimide film includes the polyamideimide composite.

The polyamideimide film may have light transmittance of greater than or equal to about 80% for light in a wavelength range of 300 to 800 nanometers and haze of less than or equal to about 2.0.

The polyamideimide film may have a yellow index (YI) of less than or equal to about 3.5.

According to another embodiment, an electronic device includes the polyamideimide film.

According to another embodiment, a method of manufacturing a polyamideimide film includes:

preparing a polyamideimide precursor, reacting the polyamideimide precursor with a reactive organosilane compound to prepare a polyamideimide precursor modified with an alkoxysilane group, preparing an oligosilica compound through a non-hydrolytic condensation reaction of the organosilane diol and an alkoxysilane compound, mixing the polyamideimide precursor modified with an alkoxysilane group with the oligosilica compound, and curing the mixture.

The oligosilica compound may be prepared in the presence of an alkaline-earth metal hydroxide.

Optical properties and mechanical characteristics of the polyamideimide film may be improved.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
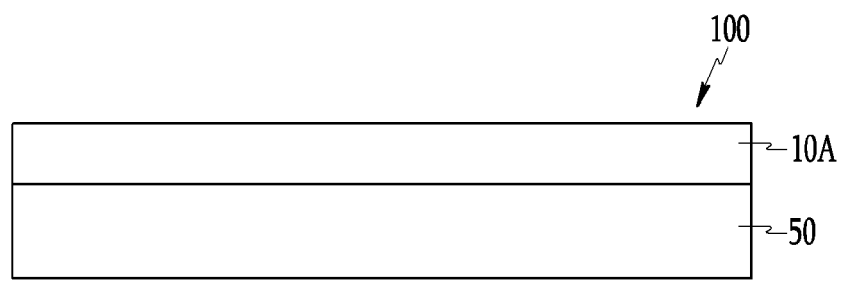
FIG. 1 is a cross-sectional view showing a display device 100 according to an embodiment.

Hereinafter, reference will be made to exemplary embodiments, examples of which are illustrated in the accompanying drawings, wherein like reference numerals refer to like elements throughout. However, these embodiments are exemplary, and this disclosure is not limited thereto. In this regard, the present exemplary embodiments may have different forms and should not be construed as being limited to the descriptions set forth herein. Accordingly, the exemplary embodiments are merely described below, by referring to the figures, to explain aspects of the present inventive concept. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, when specific definition is not otherwise provided, the term "substituted" refers to one substituted with at least one substituent selected from —F, —Cl, —Br, or —I, a hydroxy group, a nitro group, a cyano group, an amino group ($NH_2$, $NH(R^{100})$, or $N(R^{101})(R^{102})$, wherein $R^{100}$, $R^{101}$, and $R^{102}$ are the same or different, and are independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group (e.g., a cycloalkyl group and the like), a substituted or unsubstituted aryl group (e.g., a benzyl group, a naphthyl group, a fluorenyl group, and the like), a substituted or unsubstituted alkenyl group, a substituted or unsubstituted alkynyl group, a substituted or unsubstituted heteroaryl group, and a substituted or unsubstituted heterocyclic group instead of at least one hydrogen of the given functional group or compound, and the substituents may be linked to each other to provide a ring.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1 to C30 alkyl" refers to a C1 to C30 alkyl group substituted with C6 to C30 aryl group, the total number of carbon atoms in the resulting aryl substituted alkyl group is C7 to C60.

As used herein, when specific definition is not otherwise provided, the term "alkyl group" refers to a C1 to C30 alkyl group, for example, a C1 to C15 alkyl group, the term "cycloalkyl group" refers to a C3 to C30 cycloalkyl group, for example, a C3 to C18 cycloalkyl group, the term "alkoxy group" refers to a C1 to C30 alkoxy group, for example, a C1 to C18 alkoxy group, the term "ester group" refers to a C2 to C30 ester group, for example, a C2 to C18 ester group, the term "ketone group" refers to a C2 to C30 ketone group, for example, a C2 to C18 ketone group, the term "aryl group" refers to a C6 to C30 aryl group, for example, a C6 to C18 aryl group, and the term "alkenyl group" refers to a C2 to C30 alkenyl group, for example, a C2 to C18 alkenyl group.

As used herein, "alkylene" refers to a straight or branched chain, saturated, aliphatic hydrocarbon group having a valence of at least two, optionally substituted with one or more substituents where indicated, provided that the valence of the alkylene group is not exceeded.

As used herein, "arylene" refers to a divalent radical formed by the removal of two hydrogen atoms from one or more rings of an aromatic hydrocarbon, wherein the hydrogen atoms may be removed from the same or different rings (preferably different rings), each of which rings may be aromatic or non-aromatic.

As used herein, "heteroalkylene" group refers to an alkylene group that comprises at least one heteroatom covalently bonded to one or more carbon atoms of the alkylene group. Each heteroatom is independently chosen from nitrogen (N), oxygen (O), sulfur (S), and phosphorus (P).

As used herein, the term "reactive organosilane compound" refers to an organosilane compound having a functional group capable of reacting with a reactive functional group (e.g., an anhydride group or an amine group) of a condensation reaction product of an acid anhydride compound and a diamine compound.

As used herein, the term "polyamic acid modified with an alkoxysilane group" refers to "a polyamic acid that is modified to have an alkoxysilane group."

As used herein the term "alkoxysilane group" refers to a group derived from a silane having at least one (e.g., one, two, three, four etc.) alkoxy group (e.g., alkoxysilyl and the like).

As used herein, the term "silica" is not limited to $SiO_2$ but refers to any Si—O linkage based material. Depending on the context, the term "silica" may refer to an inorganic material represented by $SiO_x$ (wherein x is about 1.5 to 2.5), a siloxane, and/or an organic material such as a silica or a siloxane including an organic substituent group (e.g., hydrogen, alkyl, aryl and the like).

As used herein, the term "combination" refers to a mixture of two or more and a stacked structure of two or more.

Hereinafter, the term "imide" refers to imide by itself and also refers to imide and amic acid that is a precursor of the imide.

A composition according to an embodiment includes a polyamideimide precursor modified with an alkoxysilane group and an oligosilica compound that is a condensation reaction product of an organosilane diol and an alkoxysilane compound.

The composition does not substantially include water. For example, in the composition, a content of water is a trace amount of less than or equal to about 100 parts per million (ppm). The content of moisture (e.g., a trace amount of moisture included in a reactant or a solvent) may be inevitably included in the composition during the preparation of the composition.

The polyamideimide precursor modified with an alkoxysilane group may include a reaction product of (i) a condensation product having a reactive functional group such as an acid anhydride group, an amine group, and/or a carboxylic acid group, and the like at least one terminal end, and (ii) a reactive organosilane compound.

In an embodiment, the condensation product may be obtained from an acid anhydride compound, a diamine compound and a dicarboxylic acid compound.

The acid anhydride compound may be represented by Chemical Formula A:

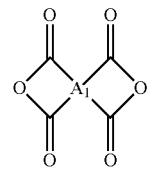

Chemical Formula A

Herein, $A_1$ is a residual group selected from a substituted or unsubstituted tetravalent C5 to C24 aliphatic cyclic group, a substituted or unsubstituted tetravalent C6 to C24 aromatic ring group, and a substituted or unsubstituted tetravalent C4 to C24 hetero aromatic ring group, wherein the aliphatic or (hetero) aromatic ring group is present alone; the two or cyclic groups are fused to each other to provide a polycyclic (aromatic) ring; or the two or more aliphatic cyclic group or the two or more (hetero) aromatic cyclic group are linked through a single bond, —O—, —S—, —C(=O)—, —CH(OH)—, —S(=O)$_2$, —Si(CH$_3$)$_2$—, —(CH$_2$)$_p$— (wherein, 1≤p≤10), —(CF$_2$)$_q$— (wherein, 1≤q≤23), a C1 to C10 alkylene group having at least one substituent selected from a C1 to C10 linear or branched aliphatic hydrocarbon group, a C1 to C10 fluoroalkyl group, a C6 to C20 aromatic hydrocarbon group, and a C6 to C20 alicyclic hydrocarbon group (e.g., CR$_2$—, wherein R is independently hydrogen, a C1 to C10 aliphatic hydrocarbon group, a C6 to C20 aromatic hydrocarbon group, or a C6 to C20 alicyclic hydrocarbon group, provided that groups R are not simultaneously hydrogen) C(=O)NH, or a combination thereof.

In Chemical Formula A, $A_1$ may be selected from the following groups:

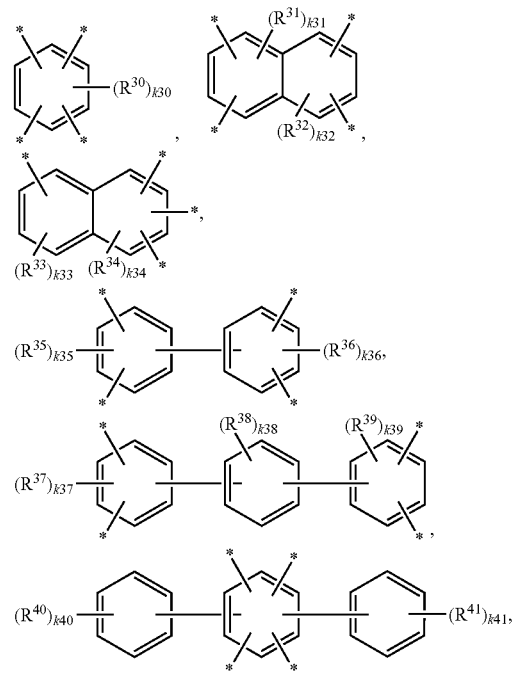

-continued

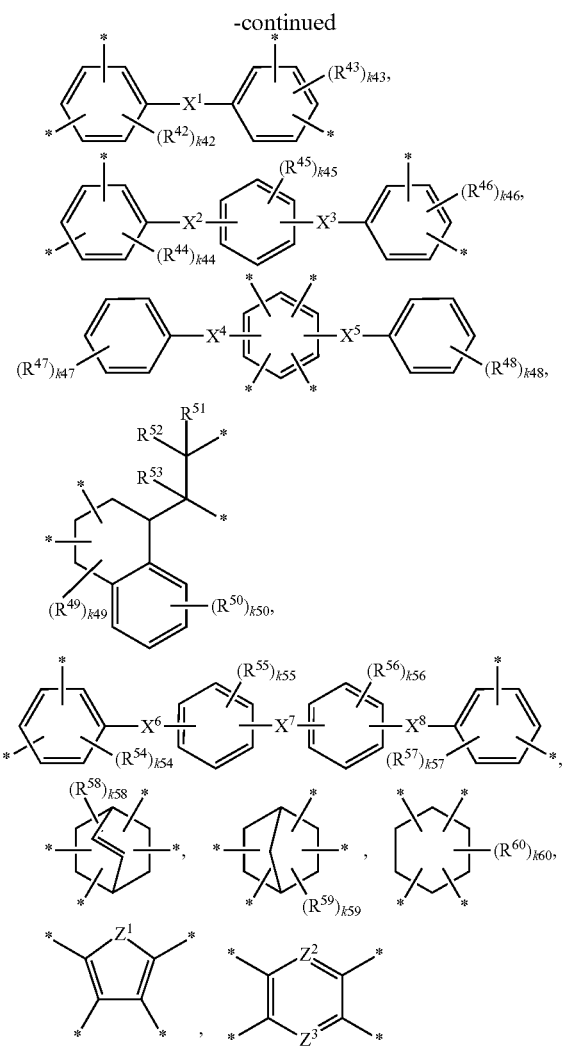

Herein, $X^1$ to $X^8$ are the same or different and are independently a direct bond, —O—, —S—, —C(=O)—, —CH(OH)—, —S(=O)$_2$—, —Si(CH$_3$)$_2$—, —(CH$_2$)$_p$— wherein $1 \leq p \leq 10$, —(CF$_2$)$_q$— wherein $1 \leq q \leq 10$, —C(CH$_3$)$_2$—, —C(CF$_3$)$_2$—, or —C(=O)NH—, $Z^1$ is —O—, —S—, or —NR$^{300}$—, wherein R$^{300}$ is hydrogen or C1 to C5 alkyl group, $Z^2$ and $Z^3$ are the same or different and are independently —N= or —C(R$^{301}$)= wherein R$^{301}$ is hydrogen or a C1 to C5 alkyl group, and $Z^2$ and $Z^3$ are not simultaneously —C(R$^{301}$)=.

R$^{30}$ to R$^{50}$ and R$^{54}$ to R$^{60}$ are the same or different and are independently halogen, a substituted or unsubstituted C1 to C10 aliphatic organic group, or a substituted or unsubstituted C6 to C20 aromatic organic group, R$^{51}$ to R$^{53}$ are the same or different and are independently hydrogen, a halogen, a substituted or unsubstituted C1 to C10 aliphatic organic group, or a substituted or unsubstituted C6 to C20 aromatic organic group, k30, k31 and k32 are independently an integer ranging from 0 to 2, k33, k35, k36, k37, k39, k42, k43, k44, k46, k54, and k57 are independently an integer ranging from 0 to 3, k34 is 0 or 1, k38, k45, k50, k55, and k56 are independently an integer of 0 to 4, k40, k41, k47, k48, and k49 are independently an integer of 0 to 5, and k58, k59, and k60 are independently an integer ranging from 0 to 8.

In Chemical Formula A, A$_1$ may be represented by one of the following groups:

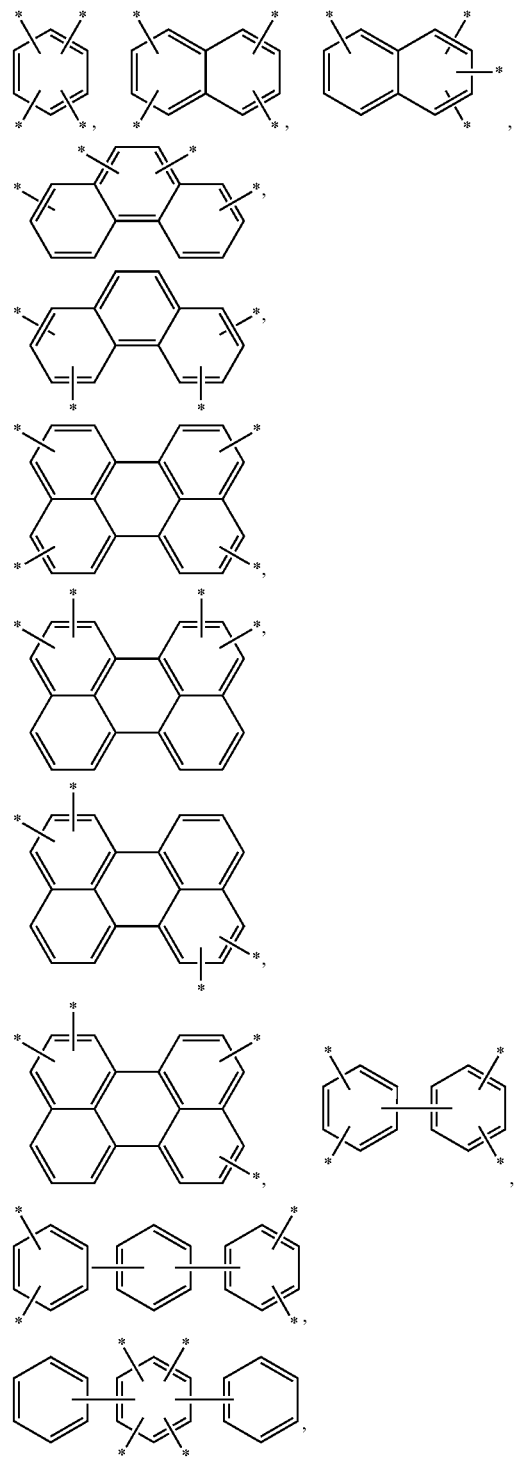

-continued

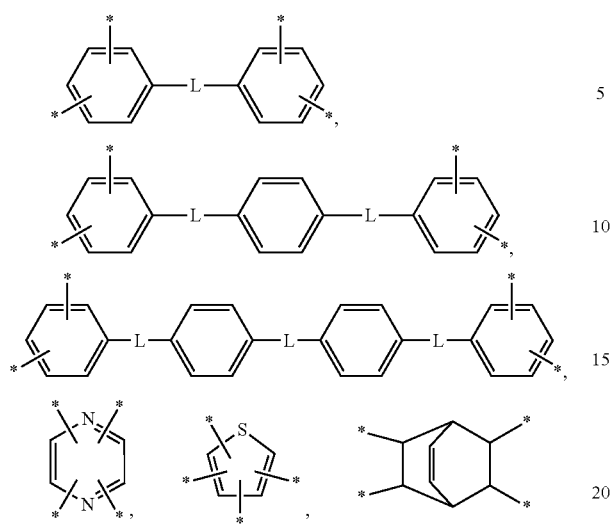

Each L is the same or different and are independently a direct bond, —O—, —S—, —C(=O)—, —CH(OH)—, —S(=O)$_2$—, —Si(CH$_3$)$_2$—, —(CH$_2$)$_p$— (wherein, 1≤p≤10), —(CF$_2$)$_q$— (wherein, 1≤q≤10), —CR$_2$— (wherein, R is the same or different and are independently hydrogen, a C1 to C10 linear or branched aliphatic hydrocarbon group, a C6 to C20 aromatic hydrocarbon group, or a C6 to C20 alicyclic hydrocarbon group, provided that two groups R are not simultaneously hydrogen), —C(CF$_3$)$_2$—, —C(CF$_3$)(C$_6$H$_5$)—, or —C(=O)NH—, and the aromatic ring is unsubstituted, or is substituted with a C1 to C15 alkyl group, —F, —Cl, —Br, —I, a C1 to C15 haloalkyl group, C1 to C15 alkoxy group, a C6 to C12 aryl group, a C6 to C12 aryloxy group, a nitro group, a hydroxy group, or a combination thereof, instead of at least one hydrogen, and * indicates a point linked to carbon of the carbonyl group.

For example, A$_1$ may be selected from the following groups, but is not limited thereto:

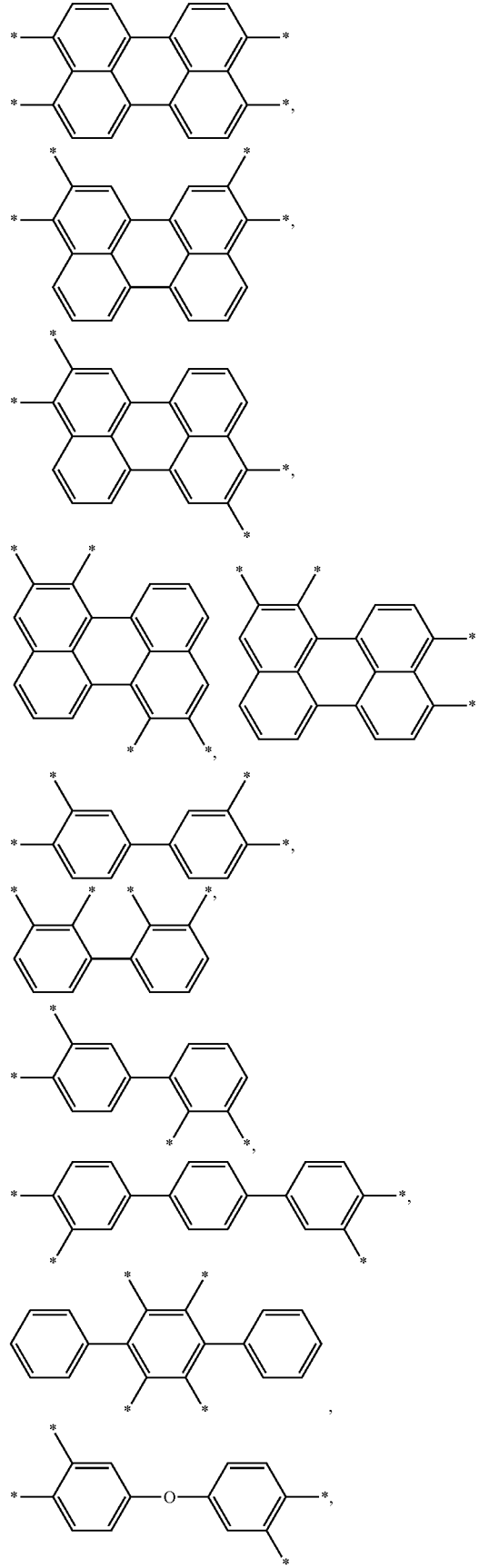

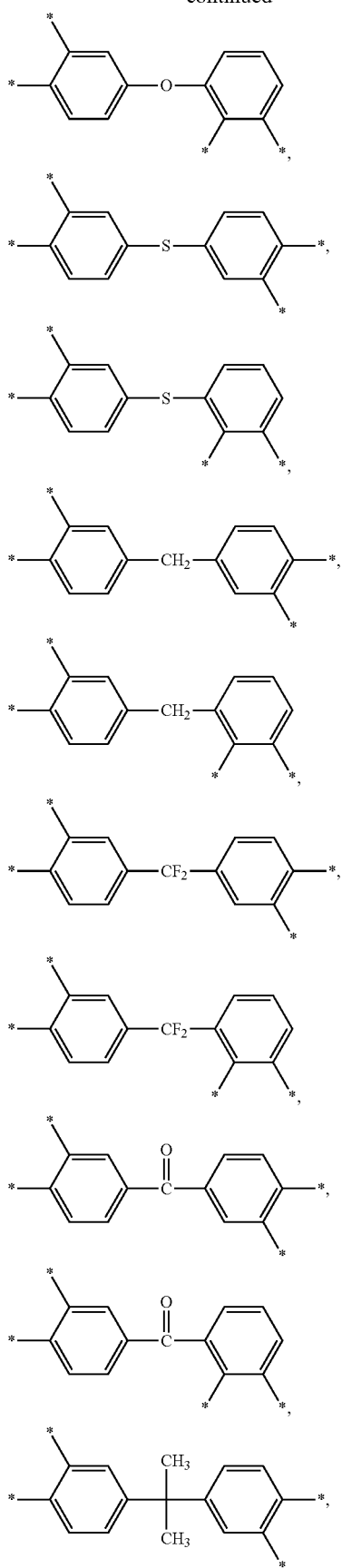
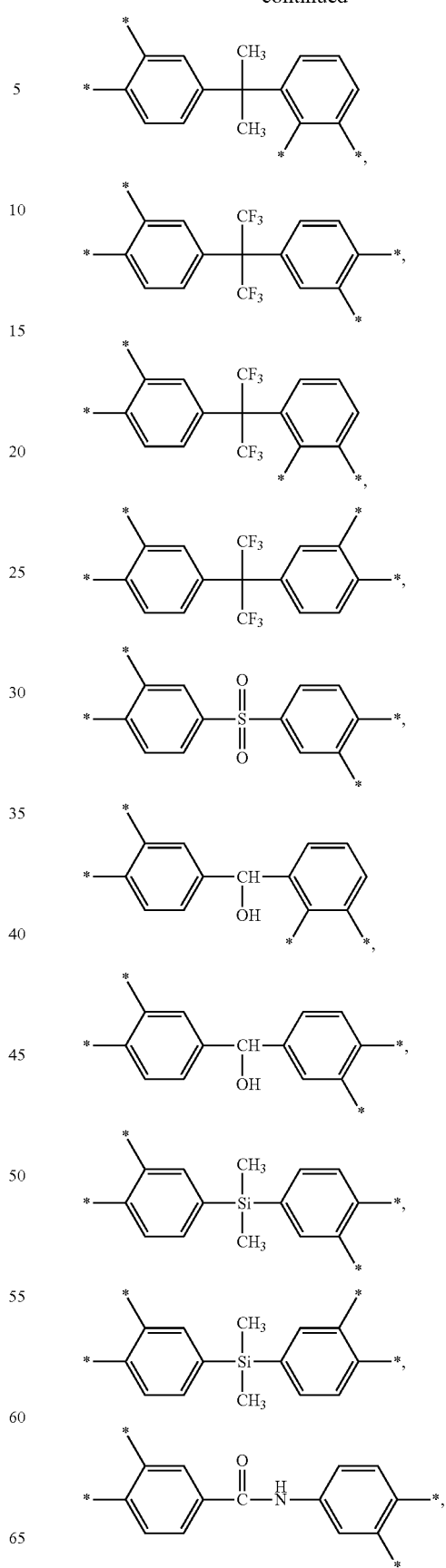

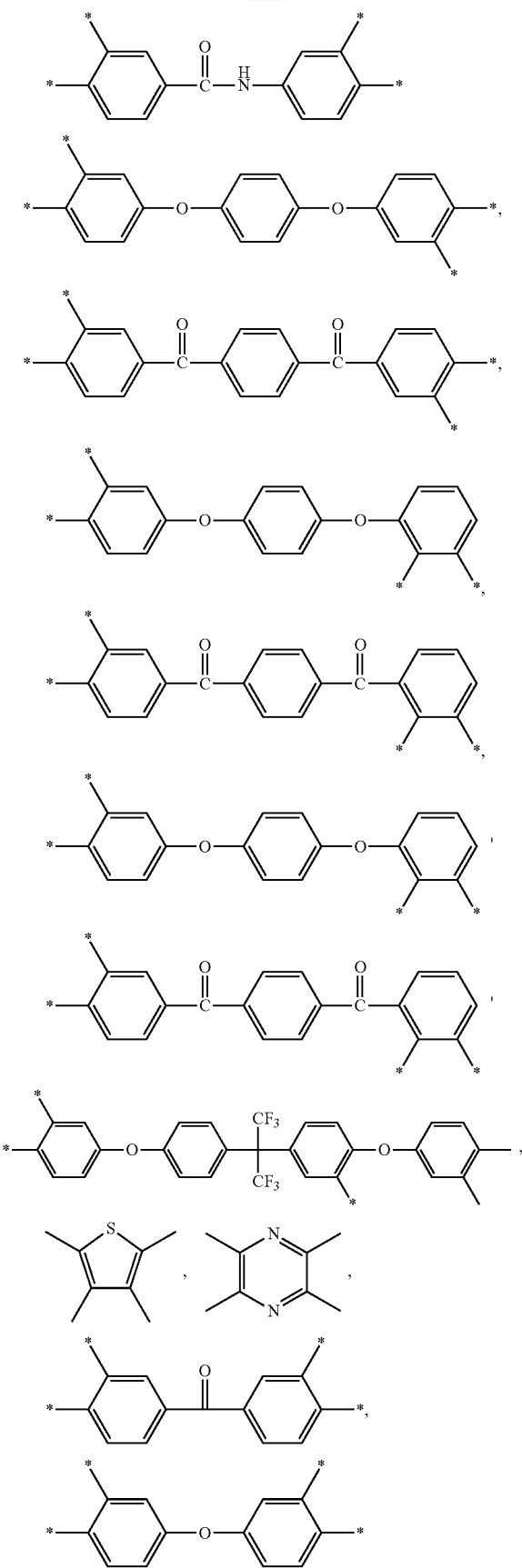

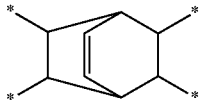

Examples of the acid dianhydride compound represented by Chemical Formula A may include 3,3',4,4'-biphenyl tetracarboxylic dianhydride (BPDA), bicyclo[2.2.2]oct-7-ene-2,3,5,6-tetracarboxylic dianhydride (BTDA), 3,3',4,4'-diphenylsulfone tetracarboxylic dianhydride (DSDA), 4,4'-(hexafluoroisopropylidene)diphthalic anhydride (6FDA), 4,4'-oxydiphthalic anhydride (ODPA), pyromellitic dianhydride (PMDA), 4-(2,5-dioxotetrahydrofuran-3-yl)-1,2,3,4-tetrahydronaphthalene-1,2-dicarboxylic anhydride (DTDA), 1,2,4,5-benzene tetracarboxylic dianhydride; 1,2,3,4-benzene tetracarboxylic dianhydride; 1,4-bis(2,3-dicarboxyphenoxy) benzene dianhydride; 1,3-bis(3,4-dicarboxyphenoxy) benzene dianhydride; 1,2,4,5-naphthalene tetracarboxylic dianhydride; 1,2,5,6-naphthalene tetracarboxylic dianhydride; 1,4,5,8-naphthalene tetracarboxylic dianhydride; 2,3,6,7-naphthalene tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,3,6,7-tetrachloronaphthalene-1,4,5,8-tetracarboxylic dianhydride; 2,2',3,3'-diphenyl tetracarboxylic dianhydride; 4,4'-bis(3,4-dicarboxyphenoxy)diphenyl dianhydride; bis(2,3-dicarboxylphenyl) ether dianhydride; 4,4'-bis(2,3-dicarboxyphenoxy) diphenyl ether dianhydride; 4,4'-bis(3,4-dicarboxyphenoxy) diphenyl ether dianhydride; bis(3,4-dicarboxylphenyl) sulfide dianhydride; 4,4'-bis(2,3-dicarboxyphenoxy) diphenylsulfide dianhydride; 4,4'-bis(3,4-dicarboxyphenoxy) diphenylsulfide dianhydride; bis(3,4-dicarboxylphenyl) sulfone dianhydride; 4,4'-bis(2,3-dicarboxyphenoxy) diphenylsulfone dianhydride; 4,4'-bis(3,4-dicarboxylphenoxy) diphenylsulfone dianhydride; 3,3',4,4'-benzophenone tetracarboxylic acid dianhydride; 2,2',3,3'-benzophenone tetracarboxylic acid dianhydride; 2,3,3'4'-benzophenone tetracarboxylic acid dianhydride; 4,4'-bis(3,4-dicarboxylphenoxy) benzophenone dianhydride; bis(2,3-dicarboxylphenyl) methane dianhydride; bis(3,4-dicarboxylphenyl) methane dianhydride; 1,1-bis(2,3-dicarboxylphenyl) ethane dianhydride; 1,1-bis(3,4-dicarboxylphenyl) ethane dianhydride; 1,2-bis(3,4-dicarboxylphenyl) ethane dianhydride; 2,2-bis(2,3-dicarboxylphenyl) propane dianhydride; 2,2-bis(3,4-dicarboxylphenyl) propane dianhydride; 2,2-bis[4-(2,3-dicarboxylphenoxy)phenyl] propane dianhydride; 2,2-bis[4-(3,4-dicarboxylphenoxy)phenyl] propane dianhydride; 4-(2,3-dicarboxylphenoxy)-4'-(3,4-dicarboxylphenoxy) diphenyl-2,2-propane dianhydride; 2,2-bis[4-(3,4-dicarboxylphenoxy-3,5-dimethyl) phenyl] propane dianhydride; 2,3,4,5-thiophene tetracarboxylic dianhydride; 2,3,5,6-pyrazine tetracarboxylic dianhydride; 1,8,9,10-phenanthrene tetracarboxylic dianhydride; 3,4,9,10-perylene tetracarboxylic dianhydride; 1,3-bis(3,4-dicarboxylphenyl)hexafluoropropane dianhydride; 1,1-bis(3,4-dicarboxylphenyl)-1-phenyl-2,2,2-trifluoroethane dianhydride; 2,2-bis[4-(3,4-dicarboxylphenoxy)phenyl] hexafluoropropane dianhydride; 1,1-bis[4-(3,4-dicarboxylphenoxy)phenyl]-1-phenyl-2,2,2-trifluoroethanedianhydride; and 4,4'-bis[2-(3,4-dicarboxylphenyl)hexafluoroisopropyl]diphenyl ether dianhydride. Such an acid dianhydride compound may be synthesized by a known method, or may be commercially available. The acid dianhydride compound may be used alone or as a mixture of two or more as needed.

The diamine compound may be represented by Chemical Formula B.

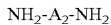   Chemical Formula B

Herein, $A_2$ is a residual group selected from a substituted or unsubstituted divalent C5 to C24 aliphatic cyclic group, a substituted or unsubstituted divalent C6 to C24 aromatic cyclic group, a substituted or unsubstituted divalent C4 to C24 hetero aromatic cyclic group, and -L-$SiR_2$—O—$SiR_2$-L (wherein L is a single bond or a C1 to C10 alkylene group), wherein the aliphatic or aromatic cyclic group is present alone; or two or more are fused to each other to provide a polycyclic (aromatic) cyclic group; or the two or more aliphatic cyclic groups or two or more aromatic cyclic group are linked through a single bond, —O—, —S—, —C(=O)—, —CH(OH)—, —S(=O)$_2$, —Si(CH$_3$)$_2$—, —(CH$_2$)$_p$— (wherein, 1≤p≤10), —(CF$_2$)$_q$— (wherein, 1≤q≤10), a C1 to C10 divalent alkylene group having at least one substituent selected from a C1 to C10 linear or branched aliphatic hydrocarbon group, a C1 to C10 fluoroalkyl group, a C6 to C20 aromatic hydrocarbon group, and a C6 to C20 alicyclic hydrocarbon group, —C(=O)NH—, or a combination thereof.

In Chemical Formula B, $A_2$ may be one of the following groups:

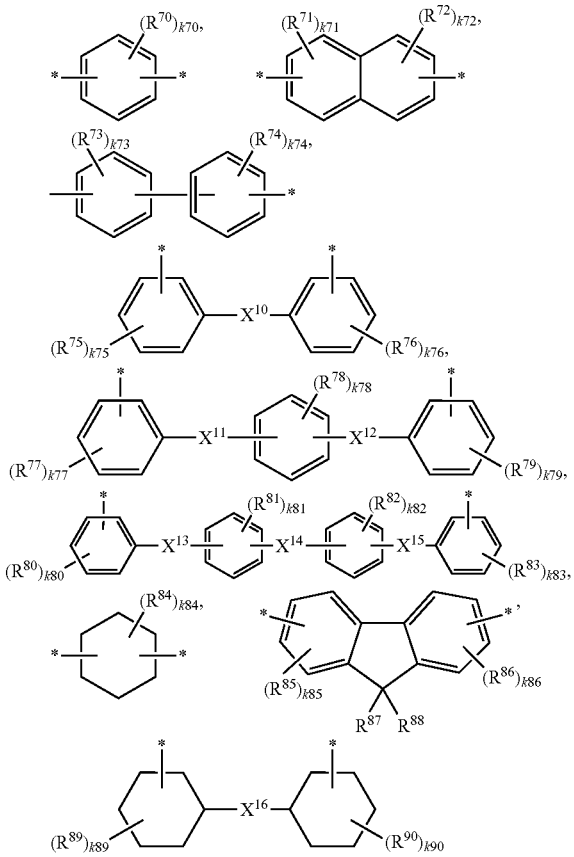

Herein, $X^{10}$ to $X^{16}$ are the same or different and are independently a direct bond, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, or —C(=O)NH—, $R^{70}$ to $R^{86}$ and $R^{89}$ to $R^{90}$ are the same or different and are independently a halogen, a substituted or unsubstituted C1 to C10 aliphatic organic group, or a substituted or unsubstituted C6 to C20 aromatic organic group (aromatic organic group), $R^{87}$ and $R^{88}$ are the same or different and are independently hydrogen, a halogen, a substituted or unsubstituted C1 to C10 aliphatic organic group, or a substituted or unsubstituted C6 to C20 aromatic organic group, k70, k73, k74, k75, k76, k77, k78, k79, k80, k81, k82, and k83 are independently an integer ranging from 0 to 4, k71, k72, k85, and k86 are independently an integer of 0 to 3, and k84, k89, and k90 are independently an integer ranging from 0 to 10.

In Chemical Formula B, $A_2$ may be selected from the following groups:

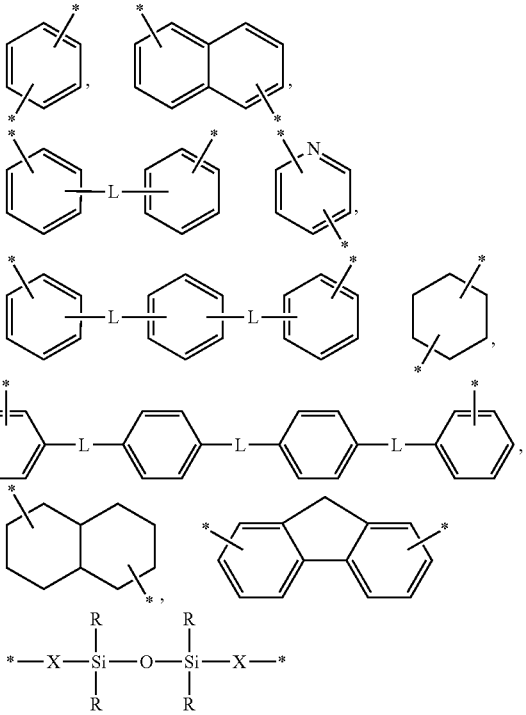

In the above formulae, L is the same or different and is a direct bond, —O—, —S—, —C(=O)—, —CH(OH)—, —S(=O)$_2$—, —Si(CH$_3$)$_2$—, —(CH$_2$)$_p$— (wherein, 1≤p≤10), —CF$_{2q}$— (wherein, 1≤q≤10), —CR$_2$— (wherein, R is the same or different and are independently hydrogen, a C1 to C10 linear or branched aliphatic hydrocarbon group, a C6 to C20 aromatic hydrocarbon group, or a C6 to C20 alicyclic hydrocarbon group, provided two groups R are not simultaneously hydrogen), —C(CF$_3$)$_2$—, —C(CF$_3$)(C$_6$H$_5$)—, or —C(=O)NH—, and X are the same or different and are independently a substituted or unsubstituted C1 to C10 alkylene group, a substituted or unsubstituted C4 to C20 cycloalkylene group, or a substituted or unsubstituted C6 to C20 arylene group, and the aromatic or alicyclic cyclic group is unsubstituted, or is substituted with a C1 to C15 alkyl group, —F, —Cl, —Br, —I, a C1 to C15 haloalkyl group, a C1 to C15 alkoxy group, a C6 to C12 aryloxy group, a nitro group, a hydroxy group, or a combination thereof, instead of at least one hydrogen, and * indicates a point linked to nitrogen.

The A₂ may be selected from the following groups, but is not limited thereto.

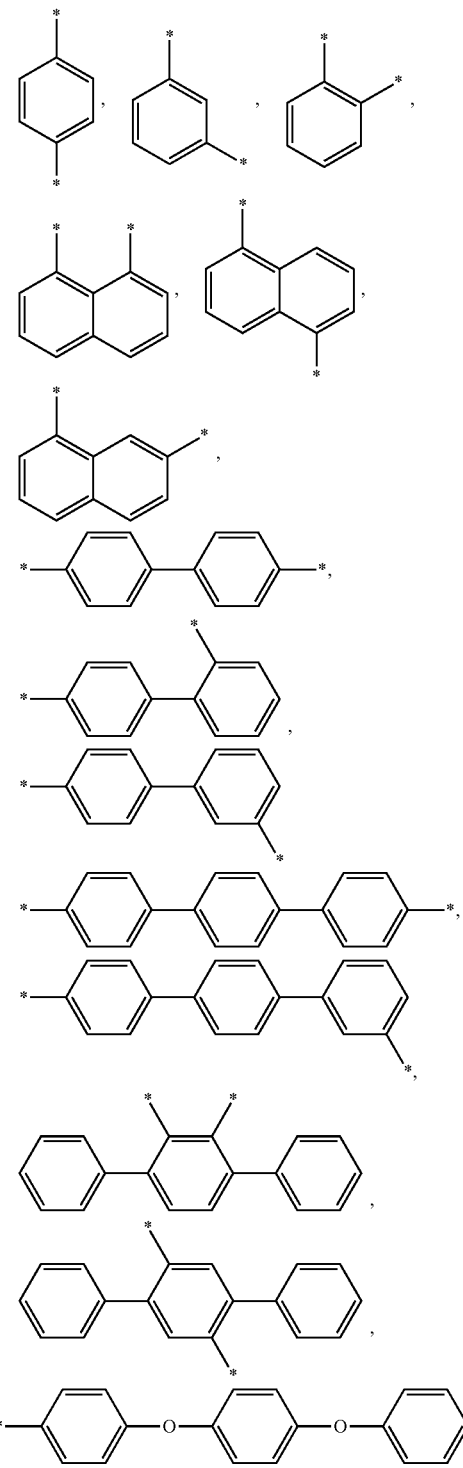

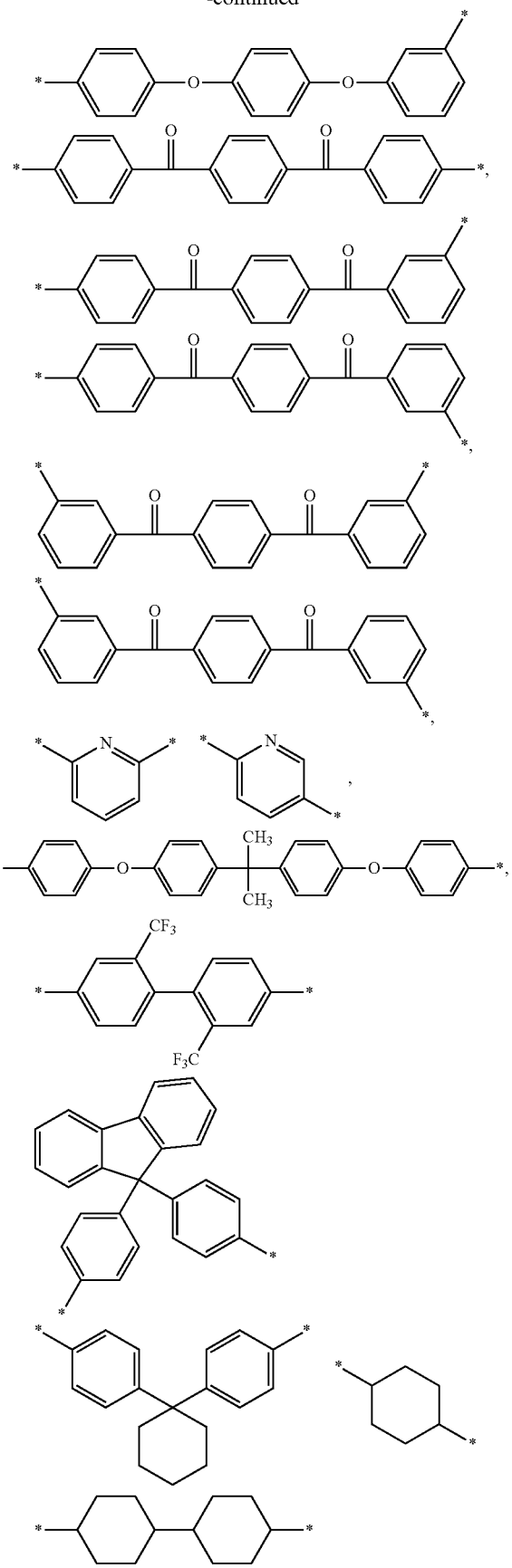

-continued
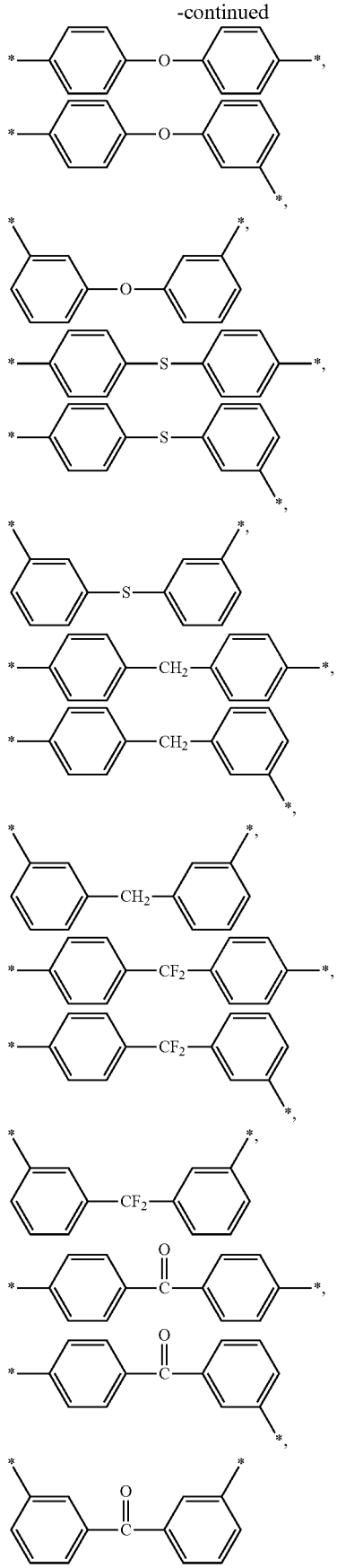
-continued
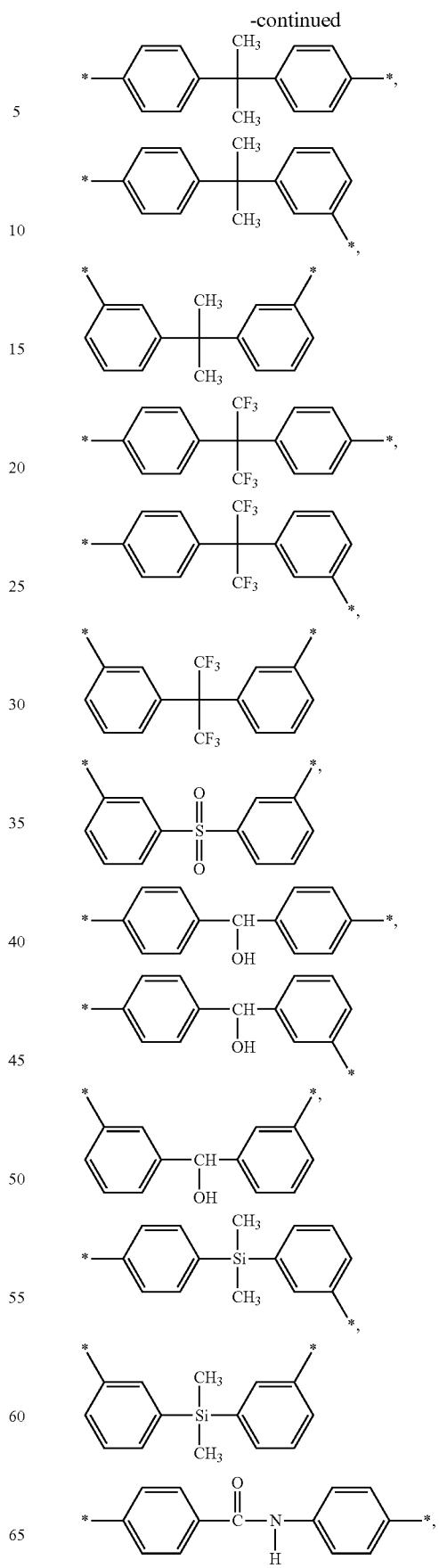

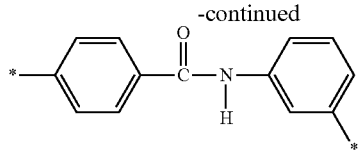

In an embodiment, the diamine compound may be one or more selected from compounds:

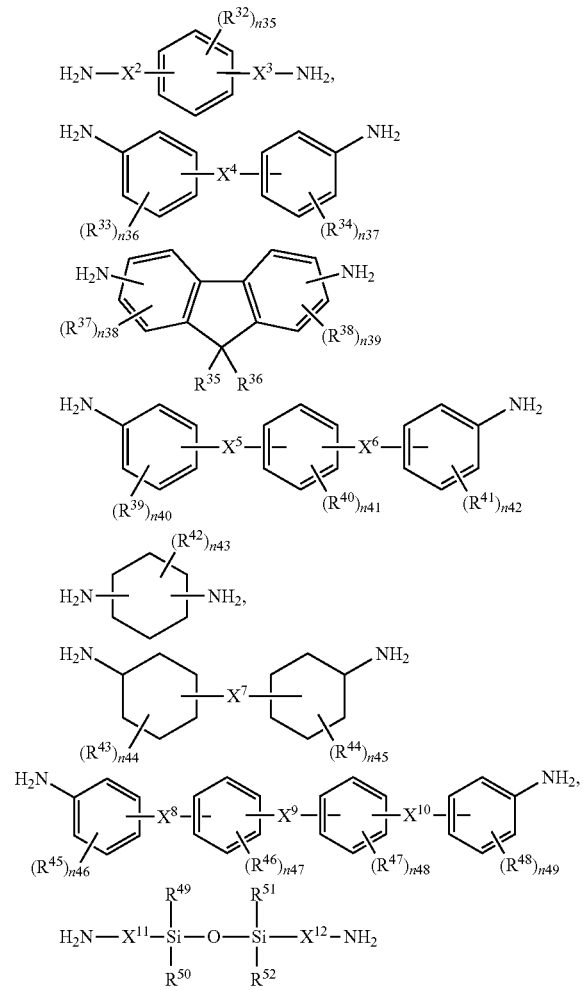

Herein, $R^{32}$ to $R^{52}$ are the same or different and are independently hydrogen, a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocyclo alkyl group, a substituted or unsubstituted C3 to C15 oxycycloalkyl group, a substituted or unsubstituted C6 to C15 aryl group, a substituted or unsubstituted C6 to C15 oxyaryl group, or a substituted or unsubstituted C2 to C15 heteroaryl group, $X^2$ to $X^{12}$ are the same or different and are independently a single bond, a substituted or unsubstituted C1 to C10 alkylene group, a substituted or unsubstituted C1 to C10 cycloalkylene group, a substituted or unsubstituted C6 to C15 arylene group, $SO_2$, O, CO, or a combination thereof, n35 to n37 and n40 to n49 are one of integers of 0 to 4, and n38 and n39 is one of integers of 0 to 3.

As non-limiting examples, the diamine compound may have the following chemical formulae:

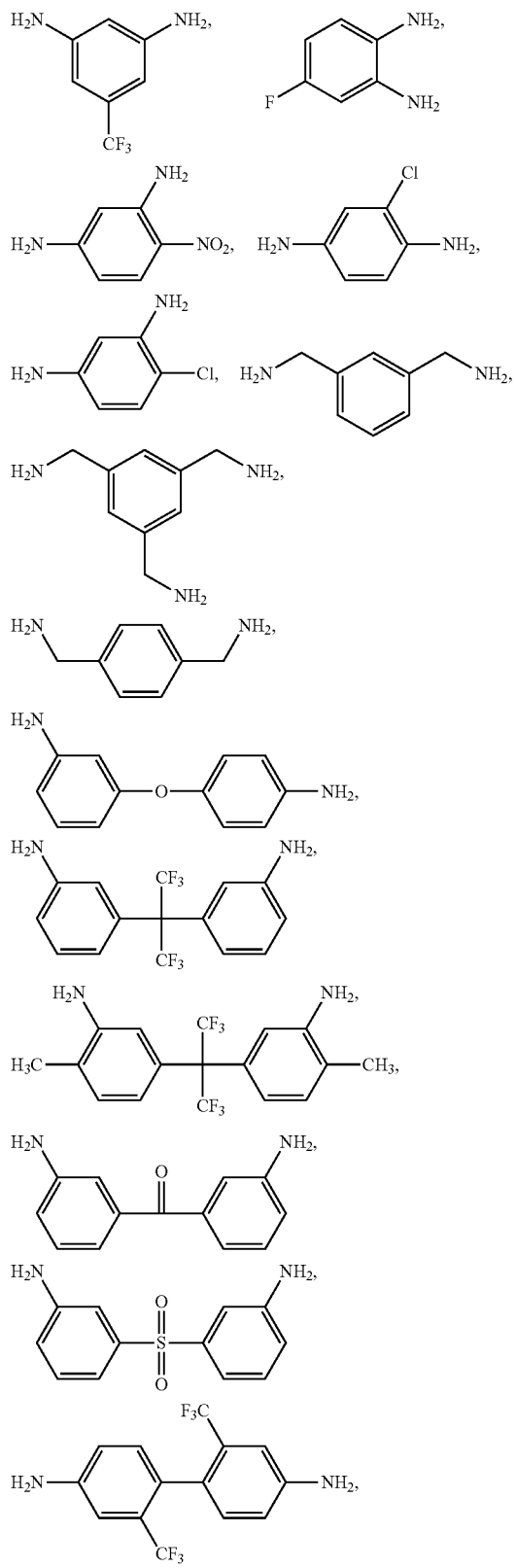

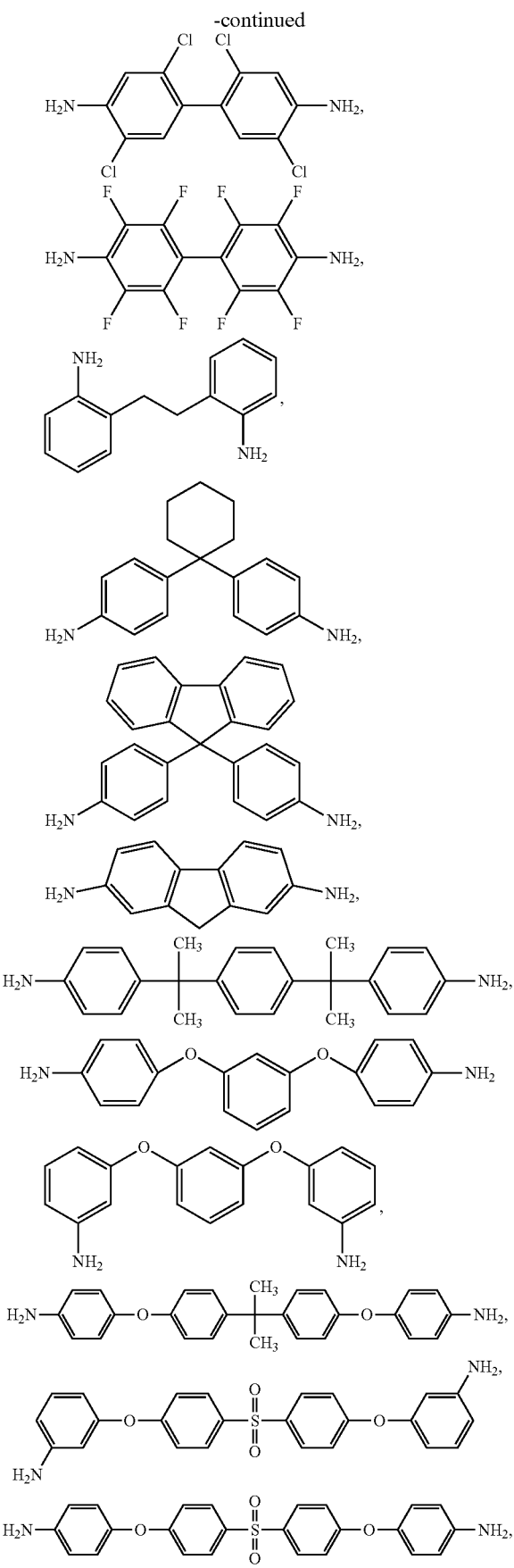

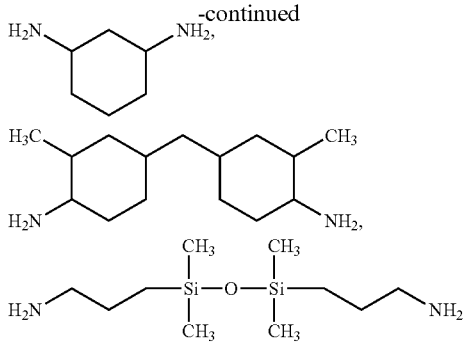

Examples of the diamine may be m-phenylene diamine; p-phenylene diamine; 1,3-bis(4-aminophenyl) propane; 2,2-bis(4-aminophenyl) propane; 4,4'-diamino-diphenyl methane; 1,2-bis(4-aminophenyl) ethane; 1,1-bis(4-aminophenyl) ethane; 2,2'-diamino-diethyl sulfide; bis(4-aminophenyl) sulfide; 2,4'-diamino-diphenyl sulfide; bis(3-aminophenyl) sulfone; bis(4-aminophenyl) sulfone; 4,4'-diamino-dibenzyl sulfoxide; bis(4-aminophenyl) ether; bis(3-aminophenyl) ether; bis(4-aminophenyl)diethyl silane; bis(4-aminophenyl) diphenyl silane; bis(4-aminophenyl) ethyl phosphineoxide; bis(4-aminophenyl) phenyl phosphineoxide; bis(4-aminophenyl)-N-phenyl amine; bis(4-aminophenyl)-N-methylamine; 1,2-diamino-naphthalene; 1,4-diamino-naphthalene; 1,5-diamino-naphthalene; 1,6-diamino-naphthalene; 1,7-diamino-naphthalene; 1,8-diamino-naphthalene; 2,3-diamino-naphthalene; 2,6-diamino-naphthalene; 1,4-diamino-2-methyl-naphthalene; 1,5-diamino-2-methyl-naphthalene; 1,3-diamino-2-phenyl-naphthalene; 4,4'-diamino-biphenyl; 3,3'-diamino-biphenyl; 3,3'-dichloro-4,4'-diamino-biphenyl; 3,3'-dimethyl-4,4'-diamino-biphenyl; 2,2'-dimethyl-4,4'-diamino-biphenyl; 3,3'-dimethoxy-4,4'-diamino-biphenyl; 4,4'-bis(4-aminophenoxy)-biphenyl; 2,4-diamino-toluene; 2,5-diamino-toluene; 2,6-diamino-toluene; 3,5-diamino-toluene; 1,3-diamino-2,5-dichloro-benzene; 1,4-diamino-2,5-dichloro-benzene; 1-methoxy-2,4-diamino-benzene; 1,4-diamino-2-methoxy-5-methyl-benzene; 1,4-diamino-2,3,5,6-tetramethyl-benzene; 1,4-bis(2-methyl-4-amino-pentyl)-benzene; 1,4-bis(1,1-dimethyl-5-amino-pentyl)-benzene; 1,4-bis(4-aminophenoxy)-benzene; o-xylylene diamine; m-xylylene diamine; p-xylylene diamine; 3,3'-diamino-benzophenone; 4,4'-diamino-benzophenone; 2,6-diamino-pyridine; 3,5-diamino-pyridine; 1,3-diamino-adamantane; bis[2-(3-aminophenyl)hexafluoroisopropyl] diphenyl ether; 3,3'-diamino-1,1'-diadamantane; N-(3-aminophenyl)-4-aminobenzamide; 4-aminophenyl-3-aminobenzoate; 2,2-bis(4-aminophenyl) hexafluoropropane; 2,2-bis(3-aminophenyl) hexafluoropropane; 2-(3-aminophenyl)-2-(4-aminophenyl)hexafluoropropane; 2,2-bis[4-(4-aminophenoxy)phenyl] hexafluoropropane; 2,2-bis[4-(2-chloro-4-aminophenoxy)phenyl hexafluoropropane; 1,1-bis(4-aminophenyl)-1-phenyl-2,2,2-trifluoroethane; 1,1-bis[4-(4-aminophenoxy)phenyl]-1-phenyl-2,2,2-trifluoroethane; 1,4-bis(3-aminophenyl) buta-1-ene-3-yne; 1,3-bis(3-aminophenyl) hexafluoropropane; 1,5-bis(3-aminophenyl) decafluoropentane; and 4,4'-bis[2-(4-aminophenoxyphenyl) hexafluoroisopropyl] diphenyl ether, diaminocyclohexane, bicyclohexyldiamine, 4,4'-diaminocyclohexylmethane, 2,2'-bis(trifluoromethyl)benzidine (TFDB) and diaminofluorene, 1,1-bis(4-aminophenyl)cyclohexane (BACH), 4,4'-(hexafluoroisopropylidene) bis(4-phenoxyaniline) (6FIDDA), and 9,9-bis(4-aminophenyl)

fluorene (BAPF), but are not limited thereto. The diamine compound may be used alone or as a mixture of two or more as needed.

For example, the condensation product may be obtained by reacting tetracarboxylic acid dianhydride compound represented by Chemical Formula A-1, a diamine compound represented by Chemical Formula B-1, and a dicarboxylic acid compound represented by Chemical Formula C-1.

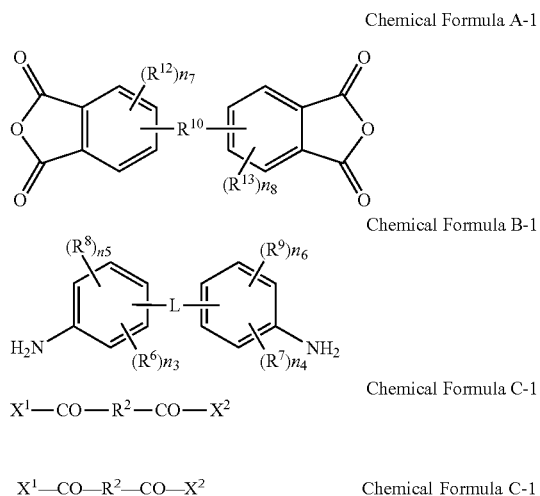

Chemical Formula A-1

Chemical Formula B-1

$X^1$—CO—$R^2$—CO—$X^2$  Chemical Formula C-1

In Chemical Formulae A-1 to C-1, L, $R^2$, $R^6$ to $R^{10}$, $R^{12}$, $R^{13}$, and n3 to n8 are the same described above, and $X^1$ and $X^2$ are independently a halogen atom.

For example, the tetracarboxylic acid dianhydride compound represented by Chemical Formula A-1 may be, for example, 3,3',4,4'-biphenyltetracarboxylic acid dianhydride (BPDA), 4,4'-(hexafluoroisopropylidene)diphthalic anhydride (6FDA) or a combination thereof, the diamine compound represented by Chemical Formula B-1 may be, for example, 2,2'-bis(trifluoromethyl)benzidine (TFDB), and the dicarboxylic acid compound represented by Chemical Formula C-1 may be, for example, 4,4'-biphenyldicarbonyl chloride (BPCL), terephthaloyl chloride (TPCL), or a combination thereof.

For example, the condensation product may be obtained by providing about 0.1 moles (mol) to about 0.7 mol of the tetracarboxylic acid dianhydride compound and about 0.3 mol to about 0.9 mol of the dicarboxylic acid compound relative to 1 mol of the diamine compound.

The condensation reaction may be performed by stirring the acid anhydride compound, the diamine compound, and the dicarboxylic acid compound under an air atmosphere or an inert gas atmosphere at a predetermined temperature (e.g., less than or equal to about 50° C.). A condition and general mechanism of such a condensation reaction is known to a person of ordinary skill in the art. A polymerization method of the condensation reaction is not particularly limited and may be desirably selected.

For example, the dicarboxylic acid compound and the diamine compound may first react to form an amide structural unit. An additional anhydride compound may be added and then reacted to link the amide structural unit with an amic acid structural unit and obtain a polyamideimide precursor.

For example, the dicarboxylic acid compound and the diamine compound react to prepare an oligomer (hereinafter, referred to as 'an amide group-containing oligomer') including an amide group and having amino groups at both terminal ends, and the amide group-containing oligomer as a diamine compound is reacted with an anhydride compound to obtain a polyamideimide precursor.

For example, the condensation reaction may be performed in a solution including a condensation catalyst as needed. In a case of a solution polymerization, a solvent may be any solvent known in preparation of a polyamideimide precursor. Examples of the solvent may be a dipolar aprotic solvent such as N-methyl pyrrolidone, dimethyl acetamide, dimethyl formamide, dimethylsulfoxide, and the like, gamma butyrolactone, monochlorobenzene, and the like, but are not limited thereto.

Examples of the condensation catalyst, may be para-toluene sulfonic acid, and the like, but are not limited thereto. In the solvent such as the dipolar aprotic solvent, a given acid anhydride compound is added to a given diamine compound, optionally, in the presence of a predetermined catalyst, at a predetermined temperature and then a condensation reaction is performed by nucleophile attack of an amino group for carbonyl carbon of an anhydride group. The polymerization time and temperature may be desirably selected according to kinds of the monomers. For example, the polymerization may be performed at less than or equal to about 50° C., for example, about −20° C. to about 30° C., for greater than or equal to about 30 minutes, for example, greater than or equal to about 1 hour. A monomer concentration in the solution may be desirably selected and is not particularly limited.

The acid anhydride compound, the diamine compound, and the dicarboxylic acid compound may be easily prepared by a known synthesis method or commercially available. A mole ratio (acid anhydride/diamine) of the acid anhydride compound relative to the diamine compound is controlled, and the condensation polymerization product has an anhydride residual group at one terminal end or both terminal ends. For example, a content of the acid anhydride compound may range from about 0.8 to about 0.99, for example, about 0.9 to about 0.97 based on 1 mol of the diamine compound.

The condensation product having a reactive functional group (e.g., an anhydride group, an amine group, or a carboxylic acid group) at one terminal end or both terminal ends may be reacted with the reactive organosilane compound to obtain the polyamideimide precursor modified with an alkoxysilane group.

The reactive organosilane compound may be, for example represented by Chemical Formula 2.

Chemical Formula 2

In Chemical Formula 2, $R_1$ to $R_3$ are independently a C1 to C6 alkyl group or a C1 to C6 alkoxy group, provided that at least one of $R_1$ to $R_3$ is a C1 to C6 alkoxy group, L is a single bond, a substituted or unsubstituted C1 to C12 alkylene group, a substituted or unsubstituted C6 to C30 arylene group, a substituted or unsubstituted C1 to C12 heteroarylene group, or a combination thereof, and A is —$NH_2$, an anhydride group, or a carboxylic acid group.

Examples of the reactive organosilane compound may include gamma-aminopropyl trimethoxysilane, aminophenyl trimethoxysilane, and 3-(triethoxysilyl)propylsuccinyl anhydride, but are not limited thereto.

A reaction condition of the reactive organosilane compound and the condensation product is not particularly limited. For example, the aminoalkoxy silane and the polyamideimide precursor are stirred at a temperature of less than or equal to about 100° C., for example, less than or equal to about 50° C., or less than or equal to about 30° C. in any solvent (e.g., dimethylformamide (DMF), dimethyl acetamide (DMAc), etc.) to obtain the polyamideimide precursor modified with an alkoxysilane group.

A content of the reactive organosilane compound may be selected considering a content of the polyamideimide precursor having a reactive functional group (e.g., an anhydride group, an amine group, or a carboxylic acid group) at one terminal end or both terminal ends and a content of the alkoxysilane compound in post-described oligosilica compound. For example, a content of the reactive organosilane compound may range from about 1 mole (mol) to about 1.5 mol per 1 mol of the reactive functional group (an anhydride, amine, or carboxylic acid residual group) of the polyamideimide precursor. For example, a content of the reactive organosilane compound (e.g., aminoalkoxysilane) may range from about 0.01 mol to about 10 mol, for example, about 0.1 mol to about 3 mol, about 0.5 mol to about 2 mol, or about 0.8 mol to about 1.5 mol per 1 mol of the alkoxysilane compound of the oligosilica compound, but is not limited thereto.

The polyamideimide precursor modified with an alkoxysilane group may react with a hydroxy group or an alkoxy group of the oligosilica compound.

The oligosilica compound includes a condensation product of an organosilane diol and an alkoxysilane compound.

The alkoxysilane compound includes monoalkoxysilane, dialkoxysilane, trialkoxysilane, tetraalkoxysilane, or a combination thereof. For example, the alkoxysilane compound may be trialkoxysilane, tetraalkoxysilane, or a combination thereof. For example, the alkoxysilane compound may be tetramethoxysilane, tetraethoxysilane, or a combination thereof.

In an embodiment, the oligosilica compound is prepared by a non-hydrolytic condensation reaction, and the prepared oligosilica compound is mixed with the condensation polymerization product to obtain the composition.

The organosilane diol may be represented by Chemical Formula 1:

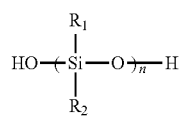

Chemical Formula 1

In Chemical Formula 1, $R_1$ and $R_2$ are independently a substituted or unsubstituted C1 to C20 alkyl group, a substituted or unsubstituted C3 to C8 cycloalkyl group, a substituted or unsubstituted C2 to C20 alkenyl group, a substituted or unsubstituted C2 to C20 alkynyl group, or a substituted or unsubstituted C6 to C20 aryl group, and n is an integer ranging from 1 to 10.

For example, at least one of $R^1$ and $R^2$ of Chemical Formula 1 may be a C6 to C20 aryl group. The organosilane diol substituted with an aryl group fortifies hydrophobic characteristics and increases dispersibility during mixing with the polyamideimide precursor.

For example, the organosilane diol may be diphenylsilane diol, diisobutylsilane diol, silanol-terminated polydimethylsiloxane, silanol-terminated polydimethylsiloxane, silanol-terminated diphenylsiloxane-dimethylsiloxane copolymer, silanol-terminated polydiphenylsiloxane, silanol-terminated polydiphenylsiloxane, silanol-terminated polytrifluoropropylmethylsiloxane, or a mixture thereof. When diphenylsilane diol is used as silane diol, an optically transparent oligosilica compound solution may be obtained.

In order to obtain transparency of the oligosilica compound or improved optical properties of the prepared composite, a content of the alkoxysilane compound may range from about 1 mol to about 10 mol per 1 mol of the organosilane diol. A non-hydrolytic condensation reaction using only an alkoxysilane compound may provide an opaque oligosilica compound. On the other hand, when the contents of the alkoxysilane compound and the silane diol is used, a clear viscous solution including the oligosilica compound may be obtained, by controlling for example, a rate of a non-hydrolytic sol-gel reaction.

The condensation reaction of the organosilane diol and the alkoxysilane compound may be a non-hydrolytic condensation reaction, for example, a non-hydrolytic sol-gel reaction in the presence of an alkaline-earth metal hydroxide. The alkaline-earth metal hydroxide may be, for example barium hydroxide or strontium hydroxide, but is not limited thereto. The present embodiment is performed by a non-hydrolytic condensation reaction and water is not added.

In general, a composition including an oligosilica compound prepared by a hydrolytic condensation reaction needs a large amount of silica in order to improve optical properties (e.g., transmittance). When a large amount of silica is included, mechanical properties of a final composite may be unavoidably deteriorated, for example, brittleness of a final composite may be significantly increased.

In contrast, even though the composition including the organo silica precursor prepared by a non-hydrolytic sol-gel reaction includes a smaller amount of silica, the prepared composite has improved optical properties (e.g., increased light transmittance and decreased yellow index). In a composition according to an embodiment, a content of the oligosilica compound may be greater than or equal to about 1 part by weight, for example, greater than or equal to about 2 parts by weight, greater than or equal to about 3 parts by weight, or greater than or equal to about 4 parts by weight based on 100 parts by weight of the polyamideimide precursor modified with an alkoxysilane group. For example, a content of the oligosilica compound may be less than or equal to about 15 parts by weight, for example, less than or equal to about 14.5 parts by weight, or less than or equal to about 14 parts by weight based on 100 parts by weight of the polyamideimide precursor modified with an alkoxysilane group. Because optical properties can be improved due to addition of a small amount of the oligosilica compound like this, an effect of silica particle on mechanical properties such as brittleness of a composite is minimized, so quality of a composite may be improved.

On the other hand, the hydrolytic sol-gel reaction generally needs a reaction time of greater than or equal to about 24 hours. However, this non-hydrolytic sol-gel reaction may sharply reduce the reaction time for preparing a composition for a composite and also, for preparing the composite. When the oligosilica compound is prepared through the non-hydrolytic sol-gel reaction, a composition including the oligosilica compound includes neither water nor solvent for the sol-gel reaction.

Accordingly, there is no viscosity deterioration of the composition due to the water and the solvent, and thus, productivity of the composite may be improved during its manufacturing process, and the composition may be easy to handle.

On the contrary, when the oligosilica compound manufactured through the hydrolytic sol-gel reaction is included, a final composition may inevitably include water. A polyamideimide precursor, a precursor of polyamideimide, is sensitive to presence of moisture. In particular, when the polyamideimide precursor is heated under the presence of moisture, a main chain is decomposed, and thus may deteriorate a polyamideimide molecular weight of a final polymer composite, and as a result, degrade properties of a molded article (e.g., a film) including the polymer composite. In addition, when a content of an organo silica precursor manufactured through the hydrolytic sol-gel reaction is increased, a final composition may include an increased amount of water, and this increased amount of water may lower viscosity of a polyamideimide precursor solution, and thus deteriorate processibility and handling property.

In non-limiting examples, a hydroxy group of silanediol and an alkoxy group of alkoxysilane have the non-hydrolytic condensation reaction (e.g., as alcohol falls out), and thus may form a cross-linked silica precursor. The non-hydrolytic condensation reaction may be performed under presence of a metal hydroxide catalyst. Non-limiting examples of the metal hydroxide catalyst may include barium hydroxide, strontium hydroxide, and the like. The catalyst may be included in an amount of about 0.0001 to about 10 mole percent (mol %), for example, about 0.001 to about 1 mol %, about 0.01 to about 1 mol %, or about 0.1 to about 1 mol %, but is not limited thereto. The non-hydrolytic condensation reaction may be performed for greater than or equal to about 10 minutes, for example, about 30 minutes to about 5 hours, but is not limited thereto. The reaction may be performed at a temperature of greater than or equal to about 0° C. to less than or equal to about 200° C., but is not limited thereto. For example, the reaction may be performed at room temperature. Alcohol manufactured through a condensation reaction may be removed by an appropriate method (e.g., in a reduced pressure evaporation method and the like) before mixed with a modified polyamideimide precursor.

The modified polyamideimide precursor is mixed with the oligosilica compound (manufactured through the non-hydrolytic condensation reaction) to obtain a composition.

The oligosilica compound may be included in an amount of about 0.1 percent by weight (wt %) to about 30 wt % based on a total amount of the composition. Within the range, the oligosilica compound may be for example included in an amount of about 5 wt % to about 20 wt %, or about 10 wt % to about 15 wt %.

The composition may be, if desired, manufactured into a film and the like, and dried. The drying may be performed at a temperature of about 50° C. to about 200° C., for example, about 75° C. to about 150° C., but is not limited thereto. The drying may be performed under a nitrogen atmosphere, an argon atmosphere, but is not limited thereto. The composition may be optionally dried and cured to prepare a polyamideimide composite in which organosilica (e.g., its nano particles) is dispersed. The optional drying and curing may convert the polyamideimide precursor into a polyamideimide and make the oligosilica compound forms a silica network, and in particular, a reactor (e.g., an alkoxy group or a hydroxy group) of an organo silica precursor reacts with alkoxysilane at the terminal end of the polyamideimide precursor, and thus form a cross-linking bond.

Accordingly, another embodiment provides a polyamideimide composite including a cured product of the above composition.

The curing of the composition may be performed at a sufficient temperature enough to cure the polyamideimide through heating. The temperature may be greater than or equal to about 50° C., for example, about 80° C. to about 400° C., or about 150° C. to about 300° C., but is not limited thereto. The curing may be performed under a nitrogen atmosphere, an argon atmosphere, but is not limited thereto. The composition may be free from a transmittance deterioration problem during the curing at a high temperature, and a composite obtained through the curing may show improved transparency, a decreased coefficient of thermal expansion, and improved heat resistance compared with a composition including an oligosilica compound, a hydrolytic sol-gel reaction product. In particular, even when a silica content is low in the composite, the above effect may be obtained.

The cured product may include a polyamideimide matrix and an oligosilica compound bound to or dispersed in the polyamideimide matrix.

The polyamideimide matrix may include, for example an amide structural unit and an imide structural unit.

For example, the polyamideimide matrix may include a structural unit represented by Chemical Formula D and a structural unit represented by Chemical Formula E.

Chemical Formula D

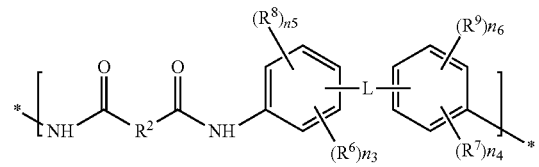

In Chemical Formula D,

L is a single bond, —CONH—, -Ph-CONH-Ph-, or —NHCO-Ph-CONH—, wherein "Ph" is substituted or unsubstituted phenylene, $R^2$ is a divalent organic group including one or two or more substituted or unsubstituted aromatic rings, wherein two or more aromatic rings are bound to each other to form a fused ring or two or more aromatic rings are linked to each other through a single bond, O, S, S(=O)$_2$, C=O, C(=O) NH, CR$^a$(OH), SiR$^b$R$^c$, or (CR$^d$R$^e$)$_p$(wherein, 1≤p≤10) wherein R$^a$ to R$^e$ are independently hydrogen or a substituted or unsubstituted C1 to C30 alkyl group, $R^6$ and $R^7$ are independently an electron withdrawing group, for example —CF$_3$, —CCl$_3$, —CBr$_3$, —CO$_3$, —NO$_2$, —CN, —COCH$_3$, or —CO$_2$C$_2$H$_5$, $R^8$ and $R^9$ are independently a substituted or unsubstituted C1 to C30 alkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C3 to C30 heterocyclic group, a halogen, a hydroxy group, or a substituted or unsubstituted silyl group, n3 is an integer of 0 to 4, n5 is an integer of 0 to 3, provided that n3+n5 are an integer of 0 to 4, and n4 is an integer of 0 to 4, n6 is an integer of 0 to 3, provided that n4+n6 are an integer of 0 to 4.

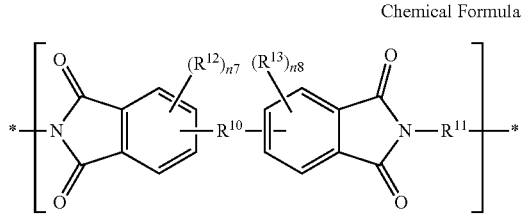

Chemical Formula E

In Chemical Formula E, $R^{10}$ is the same or different in each repeating unit and is independently a single bond, a substituted or unsubstituted C1 to C30 aliphatic organic group, a substituted or unsubstituted C3 to C30 alicyclic organic group, a substituted or unsubstituted C6 to C30 aromatic organic group, a substituted or unsubstituted C2 to C30 hetero cyclic group, or a combination thereof, $R^{11}$ is the same or different in each repeating unit and independently includes a substituted or unsubstituted C6 to C30 aromatic organic group, wherein the aromatic organic group is present alone; the two or more aromatic organic groups are fused to each other to provide a condensed cyclic group; the two or more aromatic organic groups are linked through a single bond, a substituted or unsubstituted fluorenyl group, O, S, C(=O), CH(OH), S(=O)$_2$, Si(CH$_3$)$_2$, (CH$_2$)$_p$ (wherein, 1≤p≤10), (CF$_2$)$_q$ (wherein, 1≤q≤10), C(CH$_3$)$_2$, C(CF$_3$)$_2$, or C(=O)NH, $R^{12}$ and $R^{13}$ are independently a substituted or unsubstituted C1 to C30 alkyl group, a substituted or unsubstituted C3 to C30 cycloalkyl group, a substituted or unsubstituted C1 to C30 alkoxy group, a substituted or unsubstituted C6 to C30 aryl group, a substituted or unsubstituted C3 to C30 heterocyclic group, a halogen, a hydroxy group, or a substituted or unsubstituted silyl group, and n7 and n8 are independently an integer of 0 to 3.

For example, the structural unit represented by Chemical Formula D may be a structural unit represented by Chemical Formula D-1, a structural unit represented by Chemical Formula D-2, or a combination thereof, but is not limited thereto.

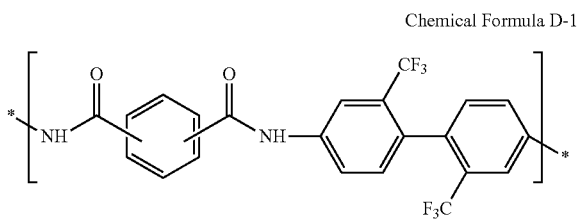

Chemical Formula D-1

Chemical Formula D-2

For example, the structural unit represented by Chemical Formula E may include a structural unit represented by Chemical Formula E-1, a structural unit represented by Chemical Formula E-2, or a combination thereof, but is not limited thereto.

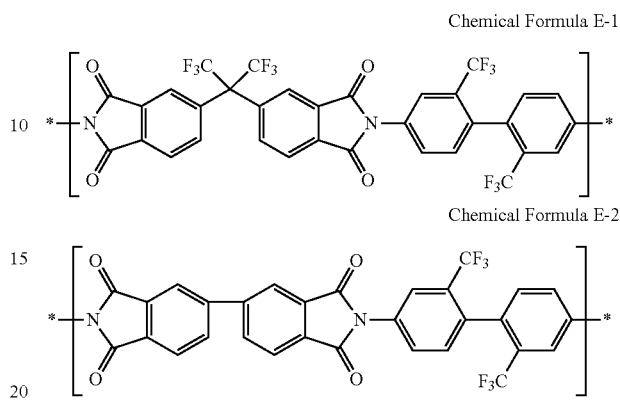

Chemical Formula E-1

Chemical Formula E-2

For example, the polyamideimide matrix may include the structural unit represented by Chemical Formula D and the structural unit represented by Chemical Formula E in a ratio of about 90:10 to about 10:90. Within the ranges, for example the structural unit represented by Chemical Formula D and the structural unit represented by Chemical Formula E may be included in a ratio of about 90:10 to about 30:70. Within the ranges, for example the structural unit represented by Chemical Formula D and the structural unit represented by Chemical Formula E may be included in a ratio of about 90:10 to about 50:50. For example the structural unit represented by Chemical Formula D may be included in a larger amount than the structural unit represented by Chemical Formula E.

In an embodiment, the cured product includes no silica particle having a size of greater than or equal to about 200 nanometers (nm), (for example, greater than or equal to about 150 nm), when examined with a transmission electron microscope (TEM). The cured product includes no domain of oligosilica separated from a polyamideimide matrix, when examined with the transmission electron microscope (TEM). The polyamideimide composite may include Si, for example, in an amount of about 4 wt % to about 14 wt % based on the entire weight of the composite. When the Si is included within the range, the composite may show improved optical properties such as light transmittance, a yellow index (measured according to ASTM D1925), haze, and pencil hardness (measured according to ASTM D3363).

The polyamideimide composite may show (average) light transmittance of greater than or equal to about 70%, for example, greater than or equal to about 75%, for example, greater than or equal to about 80%, for example, greater than or equal to about 85%, about light in a wavelength range of about 300 nm to 800 nm, light transmittance of greater than or equal to about 65%, for example, greater than or equal to about 68% for light having a wavelength of about 430 nm, YI of less than or equal to about 3.5, haze of less than or equal to about 2.0, for example, less than or equal to about 1.5, and pencil hardness of greater than or equal to 2H, for example, greater than or equal to 3H. For example, the polyamideimide composite may have light transmittance of greater than or equal to about 80%, YI of less than or equal to about 3.5, haze of less than or equal to about 2.0, and pencil hardness of greater than or equal to 2H simultaneously.

The polyamideimide composite may have an elastic modulus of greater than or equal to about 5.2 gigapascals (GPa). The elastic modulus may be realized by increasing a polymer inter-chain packing of the amide-imide copolymer including the amide structural unit and/or the imide structural unit. The polyamideimide composite may have, for example an elastic modulus of about 5.2 GPa to about 10.0 GPa, an elastic modulus of about 5.3 GPa to about 9.0 GPa, an elastic modulus of about 5.4 GPa to 8.0 GPa, or an elastic modulus of about 5.5 GPa to about 7.0 GPa. While not wishing to be bound by theory, it is understood that the polyamideimide composite may have improved mechanical characteristics when the elastic modulus is within the ranges.

In addition, the composite may show remarkably improved heat resistance at a temperature of greater than about 300° C., for example, about 400° C. Accordingly, the composite may solve an optical and physical characteristics deterioration problem of a polyamideimide film during its following high temperature process. For example, the polyamideimide composite may show a coefficient of thermal expansion (CTE) of less than or equal to about 150 parts per million per degree Centigrade (ppm/° C.), for example, less than or equal to about 130 ppm/° C., which is obtained by heating a specimen under a load of about 0.05 Newtons (N) from about 30° C. up to about 400° C. at a speed of about 10 degrees Centigrade per minute (° C./min).

In another embodiment, a film (a polyamideimide film) includes the polyamideimide composite.

The polyamideimide film may have a thickness of about 20 micrometers (μm) to about 100 μm. Within the ranges, the film may have a thickness of about 30 μm to about 95 μm.

The polyamideimide film may show (average) light transmittance of greater than or equal to about 70%, for example, greater than or equal to about 75%, for example, greater than or equal to about 80%, for example, greater than or equal to about 85%, about light in a wavelength range of about 300 nm to 800 nm, light transmittance of greater than or equal to about 65%, for example, greater than or equal to about 68% for light having a wavelength of about 430 nm, YI of less than or equal to about 3.5, haze of less than or equal to about 2.0, for example, less than or equal to about 1.5, and pencil hardness of greater than or equal to 2H, for example, greater than or equal to 3H. For example, the polyamideimide film may have light transmittance of greater than or equal to about 80%, YI of less than or equal to about 3.5, haze of less than or equal to about 2.0, and pencil hardness of greater than or equal to 2H simultaneously.

The polyamideimide film may have an elastic modulus of greater than or equal to about 5.2 gigapascals (GPa). The elastic modulus may be realized by increasing a polymer inter-chain packing of the amide-imide copolymer including the amide structural unit and/or the imide structural unit. The polyamideimide film may have, for example an elastic modulus of about 5.2 GPa to about 10.0 GPa, an elastic modulus of about 5.3 GPa to about 9.0 GPa, an elastic modulus of about 5.4 GPa to 8.0 GPa, or an elastic modulus of about 5.5 GPa to about 7.0 GPa. While not wishing to be bound by theory, it is understood that the polyamideimide film may have improved mechanical characteristics when the elastic modulus is within the ranges.

In addition, the polyamideimide film may show remarkably improved heat resistance at a temperature of greater than about 300° C., for example, about 400° C. Accordingly, the polyamideimide film may solve an optical and physical characteristics deterioration problem of a polyamideimide film during its following high temperature process. For example, the polyamideimide film may show a coefficient of thermal expansion (CTE) of less than or equal to about 150 ppm/° C., for example, about 130 ppm/° C., which is obtained by heating a specimen under a load of about 0.05 N from about 30° C. up to about 400° C. at a speed of about 10° C./min.

In another embodiment, an electronic device includes the film. The film may be used as a substrate, an insulation layer, a dielectric layer, a planarization layer, a protective layer, a protective film, and the like in an electronic device.

FIG. 1 is a cross-sectional view showing a display device 100 according to an embodiment.

Referring to FIG. 1, a display device 100 according to an embodiment includes a display panel 50 and a window 10A.

The display panel 50 may be, for example, an organic light emitting diode display panel or a liquid crystal display panel, for example, a bendable display panel, a foldable display panel, or a rollable display panel.

The window 10A may include the polyamideimide film and may be disposed on an observer side.

Another layer (not shown) may be interposed between the display panel 50 and the window 10A, for example, a single polymer layer or a plurality of polymer layers (not shown), and optionally, a transparent adhesion layer (not shown) may be further included.

Figure 2:
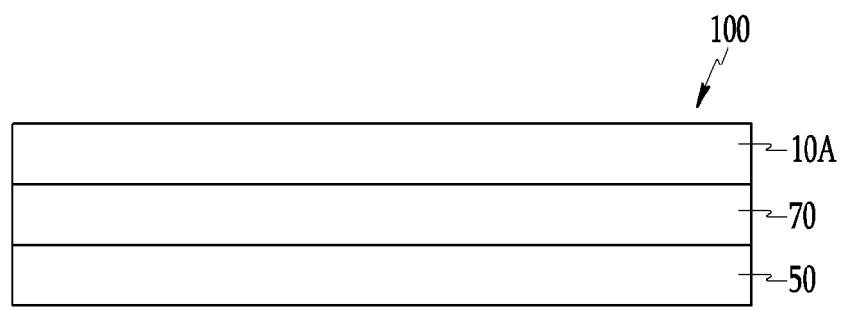
FIG. 2 is a cross-sectional view of a display device 100 according to another embodiment.

FIG. 2 is a cross-sectional view of a display device 100 according to another embodiment.

Referring to FIG. 2, the display device 100 according to the present embodiment includes a display panel 50, a window 10A, and a touch screen panel 70 disposed between the display panel 50 and the window 10A.

The display panel 50 may be, for example, an organic light emitting diode display panel or a liquid crystal display panel, for example, a bendable display panel, a foldable display panel, or a rollable display panel.

The window 10A may be or include the polyamideimide file and may be disposed on an observer side.

The touch panel 70 may be disposed adjacent to each of the window 10A and the display panel 50. The touch panel 70 is positioned so as to recognize the touched position and the position change when the window is touched by a human hand, or by another device or material and then to output a touch signal. The driving module (not shown) may monitor a position where the touch panel is touched based upon the output touch signal; recognize an icon marked at the touched position; and control the device response to carry out a function corresponding to the recognized icon, and, as a result, the function performance results are expressed on the display panel 50.

Another layer may be interposed between the touch panel 70 and the window 10A, for example, a single polymer layer or a plurality of polymer layers (not shown), and optionally, a transparent adhesion layer (not shown) may be further included.

Another layer (not shown) may be disposed between the touch screen panel 70 and the display panel 50, and may further include, for example, a single polymer layer or a plurality of polymer layers (not shown), and optionally, a transparent adhesive layer (not shown).

The display device may be applied to various electronic devices, for example, a smart phone, a tablet PC, a camera, a touch screen device, but is not limited thereto.

The electronic device may be a flat panel display, a touch screen panel device, a solar cell, an e-window, a heat mirror, a transparent transistor, a flexible display, a complementary metal oxide film semiconductor sensor, or a light emitting diode illumination.

Hereinafter, the present disclosure is illustrated in more detail with reference to examples. However, these examples are exemplary, and the present disclosure is not limited thereto.

Synthesis Example: Preparation of Amide Group-Containing Oligomer 1 molar equivalent (0.122 moles (mol), 39.2 grams (g)) of 2,2'-bis(trifluoromethyl)benzidine (TFDB) and 2.8 molar equivalents (0.343 mol, 27.11 g) of pyridine are dissolved in 700 g of N,N-dimethyl acetamide as a solvent in a round-bottomed flask, the TFDB remaining there is washed away with 50 milliliters (ml) of dimethyl acetamide (DMAC), 0.7 molar equivalents (0.086 mol, 17.4 g) of terephthaloyl chloride (TPCL) is added in four separate portions to the TFDB solution at 25° C., and the obtained mixture is vigorously stirred for 15 minutes.

Subsequently, the resulting solution is stirred under a nitrogen atmosphere for 2 hours, 7 L of a NaCl solution containing 350 g of NaCl is added thereto, and the mixture is stirred for 10 minutes. Then, a solid therein is filtered, and the product is then twice re-suspended in 5 L of deionized water and re-filtered. Subsequently, the final filtered product is appropriately compressed to remove most of the residual water, and dried at 90° C. under vacuum for 48 hours to obtain an amide group-containing oligomer represented by Chemical Formula F. A number average molecular weight of the obtained amide group-containing oligomer is about 997 grams per mole (g/mol).

[2] End-Capped Aminoalkyl Siloxane:

Gamma-aminopropyltrimethoxysilane is added into the polyamideimide precursor obtained from item [1] and agitated at 25° C. to cap an anhydride end of the polyamideimide precursor with alkoxysilane. Gamma-aminopropyltrimethoxysilane is added at 2.0-2.3 times the molar amount difference between diamine compound and dianhydride compound for preparing the polyamideimide precursor.

[3] Preparation of Reactive Oligo Silica Compound (Through Non-hydrolytic Condensation Reaction)

10 grams (0.066 mol) of tetramethoxysilane and 3.57 grams (0.0165 mol) of diphenyl silanediol are placed into a flask, and barium hydroxide is added thereto in an amount of 0.2 mole percent (mol %) per mol of tetramethoxysilane and agitated at 80° C. for 5 hours. Using a vacuum evaporator, methanol is removed from the obtained reaction mixture to provide a reactive oligo silica compound.

[4] Preparation of Composition

Each composition is prepared by respectively adding the reactive oligosilica compound from the item [3] in an amount of 0 to 20 wt % to a polyamideimide precursor obtained from the item [2] as shown in Table 1. The amount of silicon (Si) is 4.3 percent by weight (wt %) in the composition.

Examples: Preparation of Polyamideimide Film

The obtained composition is coated on a glass substrate to provide a film, and the obtained film is heated at a tempera-

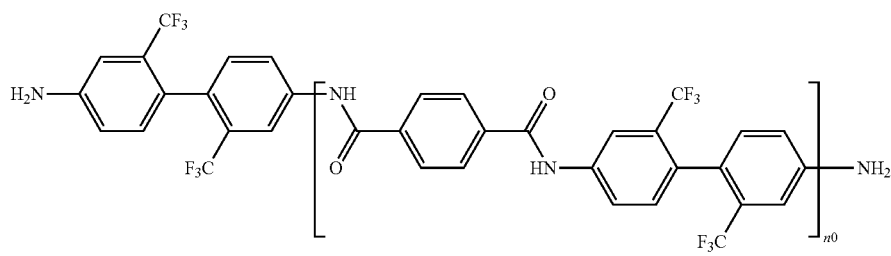

Chemical Formula F

Preparation Example: Preparation of Composition

[1] Preparation of Polyamideimide Precursor 21.7 g (0.0152 mol) of the amide group-containing oligomer prepared according to Synthesis Example and 143 ml of dimethyl acetamide (DMAc) are placed in a 250 ml 4-necked double wall reactor preheated at 30° C. and equipped with a mechanical stirrer and a nitrogen inlet. Subsequently, the solution is stirred at 30° C. under a nitrogen atmosphere until the oligomer is completely dissolved, 3.73 g (0.0084 mol) of 4,4'-(hexafluoroisopropylidene)diphthalic anhydride (6FDA) and 2.00 g (0.0068 mol) of 3,3',4,4'-biphenyltetracarboxylic dianhydride (BPDA) are slowly added thereto. Then, 10 ml of dimethyl acetamide (DMAc) is further added thereto, and the obtained solution is stirred for 48 hours to obtain an amide-amic acid copolymer solution having a solid concentration of 16 percent by weight (wt %). After decreasing a temperature down to 25° C., 4.6 g of acetic anhydride is added to the amide-amic acid copolymer solution, the mixture is stirred for 30 minutes, 3.6 g of pyridine is added thereto, and the obtained mixture is further stirred for 48 hours to obtain a polyamideimide precursor.

ture of 300° C. for 60 minutes under the nitrogen atmosphere to obtain a polyamideimide film.

Characteristic Analysis and Property Evaluation of Obtained Composite

Optical properties and mechanical characteristics of the polyamideimide films are evaluated.

Transmittance, a yellow index, and haze are evaluated by measuring light transmittance (%) of the polyamideimide films with a spectrophotometer, CM-3600d made by Minolta Co., Ltd. Transmittance may be measured full wavelength transmittance (%) to light in a wavelength of 300 to 800 nanometer (nm).

Pencil hardness is evaluated by using a pencil hardness-measurement meter and a Mitsubishi pencil according to ASTM D3363.

The elastic modulus is evaluated by extending a film specimen having a size of 10 mm (width) and 50 mm (length) (mm=millimeters) at room temperature at a speed of 25 millimeters per minute (mm/min) with an Instron 3365 (Instron Corp.), measuring five times per sample according to ASTM D882, and averaging the five measurements.

TABLE 1

| | Amount of oligosilica (wt %) | Transmittance (%) | Yellow index | Haze | Pencil hardness | Modulus (Gpa) |
|---|---|---|---|---|---|---|
| Example 1 | 5 | 88.4 | 3.4 | 1.0 | 3H | 5.4 |
| Example 2 | 10 | 88.4 | 3.1 | 1.1 | 3H | 5.8 |
| Example 3 | 15 | 88.7 | 3.0 | 0.8 | 3H | 5.6 |
| Example 4 | 20 | 88.4 | 3.3 | 1.2 | 2H | 5.2 |
| Comparative Example 1 | 0 | 88.0 | 3.8 | 1.3 | H | 5.1 |

Referring to Table 1, the polyamideimide films according to Examples 1 to 4 show improved optical properties and mechanical characteristics compared with the polyamideimide film according to Comparative Example 1.

While this disclosure has been described in connection with what is presently considered to be practical example embodiments, it is to be understood that the present inventive concept is not limited to the disclosed embodiments, but, on the contrary, is intended to cover various modifications and equivalent arrangements included within the spirit and scope of the appended claims.

What is claimed is:

1. A composition comprising:
   a polyamideimide precursor modified with an alkoxysilane group and
   an oligosilica compound,
   wherein the polyamideimide precursor is polyamide-co-poly(amic acid), and
   wherein the oligosilica compound is a condensation product of an organosilane diol and an alkoxysilane compound.

2. The composition of claim 1, wherein the composition comprises water in a trace amount of less than or equal to about 100 parts per million.

3. The composition of claim 1, wherein the composition does not comprise water.

4. The composition of claim 1, wherein the organosilane diol is represented by Chemical Formula 1:

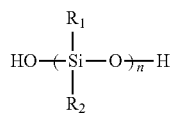

Chemical Formula 1 wherein, in Chemical Formula 1,
   $R_1$ and $R_2$ are independently a substituted or unsubstituted C1 to C20 alkyl group, a substituted or unsubstituted C3 to C8 cycloalkyl group, a substituted or unsubstituted C2 to C20 alkenyl group, a substituted or unsubstituted C2 to C20 alkynyl group, or a substituted or unsubstituted C6 to C20 aryl group, and
   n is an integer ranging from 1 to 10.

5. The composition of claim 4, wherein at least one of $R^1$ and $R^2$ of Chemical Formula 1 is a substituted or unsubstituted C6 to C20 aryl group.

6. The composition of claim 1, wherein the alkoxysilane compound includes trialkoxysilane, tetraalkoxysilane, or a combination thereof.

7. The composition of claim 6, wherein the alkoxysilane compound is tetramethoxysilane, tetraethoxysilane, or a combination thereof.

8. The composition of claim 1, wherein the oligosilica compound is obtained by a non-hydrolytic condensation reaction of the organosilane diol and the alkoxysilane compound in the presence of an alkaline-earth metal hydroxide.

9. The composition of claim 1, wherein an amount of the oligosilica compound is about 0.1 percent by weight to about 30 percent by weight based on a total amount of the composition.

10. The composition of claim 1, wherein an amount of the oligosilica compound is about 5 percent by weight to about 20 percent by weight based on a total amount of the composition.

11. The composition of claim 1, wherein the polyamideimide precursor modified with an alkoxysilane group is a reaction product of (i) a polyamideimide precursor obtained from an anhydride compound, a diamine compound, and a dicarboxylic acid compound, and (ii) a reactive organosilane compound.

12. The composition of claim 11, wherein the reactive organosilane compound is represented by Chemical Formula 2:

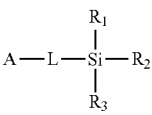

Chemical Formula 2 wherein, in Chemical Formula 2,
   $R_1$ to $R_3$ are independently a C1 to C6 alkyl group or a C1 to C6 alkoxy group, provided that one or more of $R_1$ to $R_3$ is a C1 to C6 alkoxy group,
   L is a single bond, a substituted or unsubstituted C1 to C12 alkylene group, a substituted or unsubstituted C6 to C30 arylene group, a substituted or unsubstituted C1 to C12 heteroarylene group, or a combination thereof, and
   A is $-NH_2$, an anhydride group, or a carboxylic acid group.

13. The composition of claim 12, wherein the reactive organosilane compound is gamma aminopropyl trimethoxysilane, aminophenyl trimethoxysilane, 3-(triethoxysilyl) propyl succinyl anhydride, or a combination thereof.

14. A polyamideimide composite comprising a cured product of the composition of claim 1.

15. The polyamideimide composite of claim 14, wherein the cured product comprises:
   a polyamideimide matrix, and
   an oligosilica compound bound to the polyamideimide matrix.

16. The polyamideimide composite of claim 15, wherein an amount of silicon (Si) in the composite is about 4 percent by weight to about 14 percent by weight based on a total amount of the composite.

17. A polyamideimide film comprising the polyamideimide composite of claim 14.

18. The polyamideimide film of claim 17, wherein the polyamideimide film has average light transmittance of greater than or equal to about 80% for light in a wavelength range of 300 to 800 nanometers and haze of less than or equal to about 2.0.

19. The polyamideimide film of claim 18, wherein the polyamideimide film has a yellow index (YI) of less than or equal to about 3.5.

20. An electronic device includes the polyamideimide film of claim 17.

21. A method of manufacturing a polyamideimide film, comprising:

preparing a polyamideimide precursor, reacting the polyamideimide precursor with a reactive organosilane compound to prepare a polyamideimide precursor modified with an alkoxysilane group, preparing an oligosilica compound through a non-hydrolytic condensation reaction of the organosilane diol and an alkoxysilane compound, mixing the polyamideimide precursor modified with an alkoxysilane group with the oligosilica compound, and curing the mixture, wherein the polyamideimide precursor is polyamide-co-poly(amic acid).

22. The method of claim 21, wherein the oligosilica compound is prepared in the presence of an alkaline-earth metal hydroxide.

* * * * *